United States Patent [19]
Holden et al.

[11] Patent Number: 5,255,291
[45] Date of Patent: Oct. 19, 1993

[54] MICROPROCESSOR BASED PACKET ISOCHRONOUS CLOCKING TRANSMISSION SYSTEM AND METHOD

[75] Inventors: Brian D. Holden, Half Moon Bay; Randall M. Presuhn, Campbell; William L. Robertson, San Jose, all of Calif.

[73] Assignee: Stratacom, Inc., Campbell, Calif.

[21] Appl. No.: 270,727

[22] Filed: Nov. 14, 1988

[51] Int. Cl.$^5$ ............................................. H04L 7/00
[52] U.S. Cl. ........................... 375/111; 370/94.2; 370/100.1; 375/107
[58] Field of Search ............... 375/107, 109, 106, 111; 370/94, 100, 103, 94.1, 94.3, 85.11, 91, 100.1, 105.4, 44; 455/51.1, 51.2, 69, 71; 328/63

[56] References Cited

U.S. PATENT DOCUMENTS

| | | | |
|---|---|---|---|
| 3,889,064 | 6/1975 | Fletcher | 370/105.4 |
| 4,002,839 | 1/1977 | Karl et al. | 370/103 |
| 4,136,384 | 1/1979 | Okada et al. | 370/105.4 |
| 4,142,069 | 2/1979 | Stover | 370/103 |
| 4,414,662 | 11/1983 | Bousquet | 370/105.4 |
| 4,530,091 | 7/1985 | Crockett | 370/103 |
| 4,592,050 | 5/1986 | Bensadon | 375/109 |
| 4,594,708 | 6/1986 | Servel et al. | 370/105.4 |
| 4,667,334 | 5/1987 | Collec et al. | 375/114 |
| 4,670,889 | 6/1987 | Hewitt | 375/109 |
| 4,674,082 | 6/1987 | Flanagin et al. | 370/94 |
| 4,744,080 | 5/1988 | Brennand et al. | 370/94.1 |
| 5,052,029 | 9/1991 | James et al. | 455/51.1 |
| 5,115,431 | 5/1992 | Williams et al. | 370/94.1 |

*Primary Examiner*—Benedict V. Safourek
*Attorney, Agent, or Firm*—Flehr, Hohbach, Test, Albritton & Herbert

[57] ABSTRACT

A packet voice/data communication system provides a frequency measurement isochronous clocking transmission capability. This is a method of transferring clock information by directly measuring the frequency of the clock relative to a reference and then reproducing that exact clock frequency at the far end relative to the reference which has been carried through the system.

4 Claims, 23 Drawing Sheets

FIG. 2J

SEE FIG. 2I

SEE FIG. 2F

PORTS 1-3

INTERNAL CLOCKING (IPX AS DCE)

DIAGNOSTIC LOOP CLOCKING (IPX AS DCE)
(USE ISOCHRONOUS CLOCKING)

SPLIT CLOCKING (IPX AS DCE)
(USE ISOCHRONOUS CLOCKING—UP TO 112K BAUD)

[BR] – BAUD RATE GENERATOR
[CT] – COUNTER TIMER

EXTERNAL CLOCKING, IPX AS DTE
(USE ISOCHRONOUS CLOCKING–UP TO 112K BAUD)

SPLIT CLOCKING, IPX AS DTE
(USE ISOCHRONOUS CLOCKING–UP TO 112K BAUD)

DIAGNOSTIC LOOP CLOCKING, IPX AS DTE
(USE ISOCHRONOUS CLOCKING)

[BR] – BAUD RATE GENERATOR
[CT] – COUNTER TIMER

FIG. 10
VIRTUAL CIRCUIT ADDRESS

| VA7 | VA6 | VA5 | VA4 | VA3 | VA2 | VA1 | VA0 |
|---|---|---|---|---|---|---|---|
| 7 | 6 | 5 | 4 | 3 | 2 | 1 | 0 |

FIG. 11
CHANNEL ADDRESS

| VC4 | VC3 | VC2 | VC1 | VC0 | P2 | P1 | P0 |
|---|---|---|---|---|---|---|---|
| 7 | 6 | 5 | 4 | 3 | 2 | 1 | 0 |

FIG. 12
CRC AND HEADER FORMAT CODE

| HF2 | HF1 | HF0 | CRC4 | CRC3 | CRC2 | CRC1 | CRC0 |
|---|---|---|---|---|---|---|---|
| 7 | 6 | 5 | 4 | 3 | 2 | 1 | 0 |

FIG. 13
7/8 DATA FORMAT

| D6 | D5 | D4 | D3 | D2 | D1 | D0 | 1 |
|---|---|---|---|---|---|---|---|
| 7 | 6 | 5 | 4 | 3 | 2 | 1 | 0 |

FIG. 14
8/8 DATA FORMAT

| D7 | D6 | D5 | D4 | D3 | D2 | D1 | D0 |
|---|---|---|---|---|---|---|---|
| 7 | 6 | 5 | 4 | 3 | 2 | 1 | 0 |

FIG. 16
2.7.6 TIME STAMP FORMAT

| DELAY 7 | DELAY 6 | DELAY 5 | DELAY 4 | DELAY 3 | DELAY 2 | DELAY 1 | DELAY 0 |
|---|---|---|---|---|---|---|---|
| 7 | 6 | 5 | 4 | 3 | 2 | 1 | 0 |

QSDP: BANDWIDTH EFFICIENCY

DEFINITION: $\dfrac{\text{\# USER DATA BITS/PACKET}}{\text{\# DATE BITS/PACKET}}$

| EIA CODING | LOW SPEED | HIGH SPEED |
|---|---|---|
| 7/8 | 73% | 36.5% |
| 8/8 NON OR INVERT | 83% | 41.5% |

FIG. 15

| PKT. BYTE | GENERAL FUNCTION | BIT ASSIGNMENTS 7.6.5.4.3.2.1.0 |
|---|---|---|
| 1..4 | PACKET NETWORK ADDRESSING | (SEE ABOVE) |
| 5 | UNSEQUENCED INFORMATION (UI) | 1 1 1 1 1 1 0 0 |
| 6 | EIA/CLOCK MSG | F : SEQUENCE : 0 0 0 1 |
| 7..14 | CLOCK FREQUENCY INFORMATION | 32-BIT BIT COUNT<br>32-BIT TIME STAMP |
| 15..21 | INTERFACE STATE DIBIT MAP FOR IN- AND OUTPUTS (28 TOTAL) | 1 0 FOR STEADY OFF<br>1 1 FOR STEADY ON<br>0 1 FOR ACTIVE, LATEST ON<br>0 0 FOR ACTIVE, LATEST OFF |
| 22 | INTERFACE | DCE: ITYPE : TEMPLATE |
| 23..24 | | 0 BYTES REPLACED BY FF |

FIG. 17

| DCE FIELD | | INTERMACE TYPE | | | |
|---|---|---|---|---|---|
| BIT 7 | MEANING | BIT 6 | BIT 5 | BIT 4 | MEANING |
| | | 0 | 0 | 0 | MISSING |
| 0 | DTE | 0 | 0 | 1 | V.35 |
| 1 | DCE | 0 | 1 | 0 | RS-232 |
| | | 0 | 1 | 1 | RS-449 |
| | | 1 | 0 | 0 | LPDA |

FIG. 18

| CODE | TEMPLATE SELECTION |
|---|---|
| 00h | TRI-STATE |
| 01h | ACTIVE |
| 02h | CONDITIONED |
| 03h | LOOPED |
| 04h-0Eh | RESERVED |
| 0Fh | IGNORE (NO CHANGE) |

FIG. 19

MICROPROCESSOR BASED PACKET ISOCHRONOUS CLOCKING TRANSMISSION SYSTEM AND METHOD

BACKGROUND OF THE INVENTION

The present invention relates to a telecommunications system, and more particularly to a frequency measurement isochronous clocking transmission method and apparatus.

In data communications, it is extremely important to maintain the same clock frequency between a transmitting and a receiving location. Often, a connection is desired in which the clock frequency is not related to that of the transmission system. Such a system is called an isochronous clock transmission system as the generated clock at the receiving end is the same frequency as at the transmitting end. Prior art approaches use a technique called pulse stuff synchronization or positive justification. This method uses special bits in the frame to adjust the clock frequency, and is well suited to circuit switched environments. Packet switched environments which desire isochronous clocking and do not have continuous packets must use another method. One such packet system is described in U.S. Pat. No. 4,771,425 (which is owned by the same assignee as the present invention), the details of which are hereby incorporated by reference.

Isochronous clock transmission systems are known in general. However, prior art isochronous clock transmission systems have an inherent need for continuous data transmission. This is not desirable or possible in most packet transmission systems. The prior art is known as "pulse-stuff synchronization" or "positive justification" and is used in many products. The DSIC telecommunications standard by Bell Communications Research describes the bits used in a typical application.

Many other products based on this system exist by companies such as Datatel and Timeplex. Pulse stuff synchronization functions by having specific bits in the data stream represent clocking information. These bits represent the difference between the actual clock frequency and the fractionally higher reference frequency. In the receiver, these bits are typically fed into a modulo n or n+1 divider in a phased locked loop to regenerate the input clock frequency. This type of system has an inherent need for continuous data transmission, as the bits are needed as input to the phased locked loop on a continual basis. An essential aspect of isochronous clock transmission systems is that they have 0 Hz long term frequency difference between the incoming and outgoing clocks. This need makes pulse stuff synchronization in such systems where the data is not always available, such as packet systems, untenable. A recent patent issued to a pulse stuff synchronization system is U.S. Pat. No. 4,675,886 for a frame synchronization device.

SUMMARY OF THE INVENTION

It is an object of the present invention to provide an improved clocking transmission system and method for use in a communication system.

In one preferred embodiment, the present invention is utilized in a packet voice/data communication system having a frequency measurement isochronous clocking transmission system and method. Briefly, the present invention includes the method and corresponding apparatus for transferring clock information from a first location to one or more remote locations by directly measuring the frequency of the clock relative to a reference at the first location and then reproducing that exact clock frequency at the remote locations relative to the reference which has been carried through the system.

Other objects, features and advantages of the present invention will become apparent from the following detailed description when taken in conjunction with the accompanying drawings.

BRIEF DESCRIPTION OF THE DRAWINGS

Figure 2J:
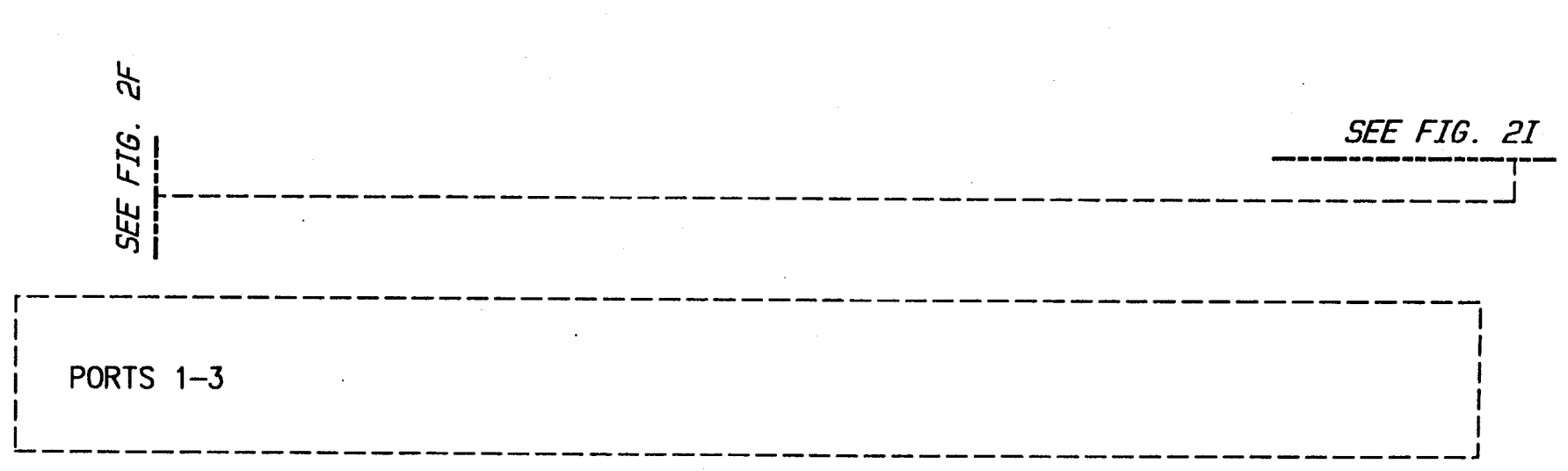

FIGS. 2A through 2J show a more detailed diagram of a synchronous data pad which forms a portion of the exchange of FIG. 1.

FIG. 10-14 and 16 show formats for virtual circuit address, channel address, CRC and header format coded, data formats and timestamp formats, respectively.

FIG. 15 shows a summary bandwidth efficiency.

FIG. 17 shows the layout of an interface and clocking message.

FIG. 18 shows interface information bits.

FIG. 19 shows template ID values.

DETAILED DESCRIPTION OF THE DRAWINGS

General Description

Figure 1A:
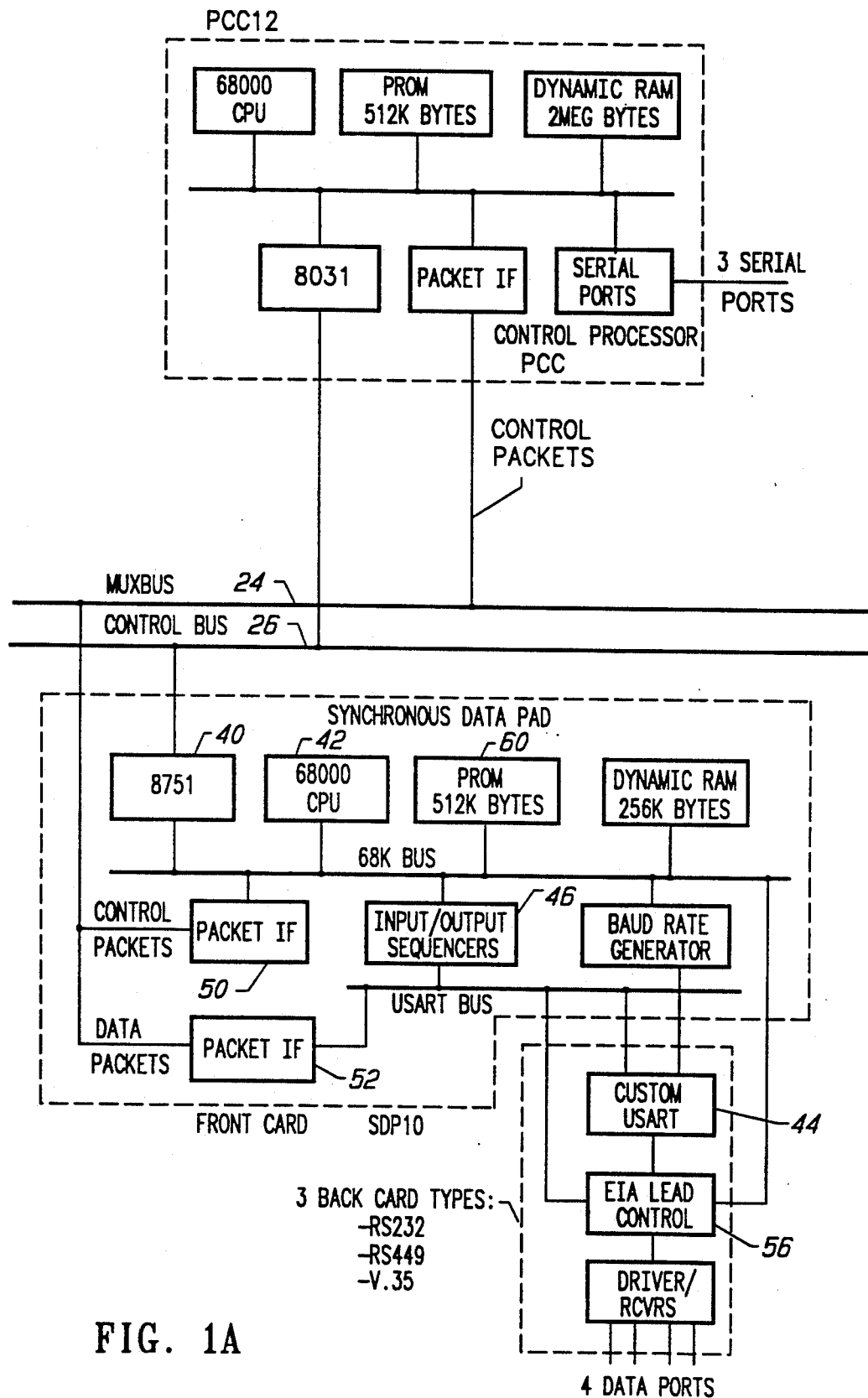
FIGS. 1A and 1B show a block diagram of an integrated packet exchange.

The Synchronous Data Pad (SDP) 10 provides a means of connecting four synchronous serial data communications devices to an integrated packet exchange (such as a Stratacom IPX) using RS232, RS449 and V.35 interfaces. The SDP 10 consists of a front card and three types of back cards, which provides for the three interface types. In addition, an SDP 10 utility bus assembly is used to interconnect the front card to the back card.

The SDP 10 supports three clock modes:
Normal—SDP receives or supplies both RxC and TxC
Split—SDP supplies on clock output and receives Isochronous clock input
Looped—SDP supplies an network synchronous clock output and expects to receive a network synchronous clock input Isochronous clock operations is supported up to 112K baud. The SDP 10 supports baud rates from 1.2K to 1344K on all four channels.

A jumper module on the interface back cards can configure the back card for DTE or DCE operation. Each interface channel supports up to 12 EIA input leads and 12 EIA output leads. The states of the EIA leads are communicated across the network via two modes of operation: Interleaved EIA support is achieved by sampling up to 7 of the leads and communicating their state with each data sample. Normal EIA support allows a user selectable update rate of from zero to twenty times per second. This is achieved by monitoring all inputs and sending a supervisory packet to the remote end whenever a lead state change is detected. The variable rate control is not applicable for isochronous clocking connections, which require a constant twenty packet per second frequency update rate to maintain the proper accuracy.

When a T1 data multiplier is used to interconnect data to the IPX, it cannot be used at data rates higher than a DS0, 64k baud, because the IPX does not keep the DS0 information that it receives in a particular T1 frame together during its packetization process. The IPX packetization process works on a DS0 basis and all DS0s are treated independently. The DS0s are packetized in the same sequential order that they were received but not kept synchronized to other DS0s. In addition, the IPX software switches full DS0s of circuit bandwidth and does not have the ability to handle less than a DS0 (subrate data) even though a T1 data multiplexer can do subrate multiplexing.

The IPX packetization circuitry (Voice Data Processor, or VDP 14) is not capable of interpreting a subrate multiplexed DS0 and packetizing individual subrate channels. It must packetize a full DS0 at a time, even if only 1.2k baud is being used. Thus, if only a single 1.2k baud channel is to be routed to a particular node in the network, the full DS0 is used. If subrate multiplexing is used with a T1 data multiplexer and several channels (four) are contained in a DS0, the subrate channels are routed together as a bundle. In this case, the DS0 bandwidth is used efficiently but the subrate channels must stay together. Because the DS0s are not synchronized during the packetization process, it is not possible to use a T1 data multiplexer at a rate higher than a DS0 (64k baud).

A special case is supported by the IPX that allows an external equipment 56K bps Digital Data Services (DDS) type connection to be packetized by a VDP 14 and terminated on an SDP 10. Note that because of VDP 14 limitations, the SDP 10 cannot terminate the subrate 9600 bps or 4800 bps DPS type connections.

The SDP 10 resides on the IPX Muxbus 24 and generates packets at a rate which is proportional to the baud rate of the data. It is the only means of generating packets at a rate higher than 64k baud and it is also the only means of generating data packets proportional to the baud rate. Thus, the SDP 10 only utilizes the amount of bandwidth needed for the specified baud rate, and it can operate at rates above a DS0.

Figure 1B:
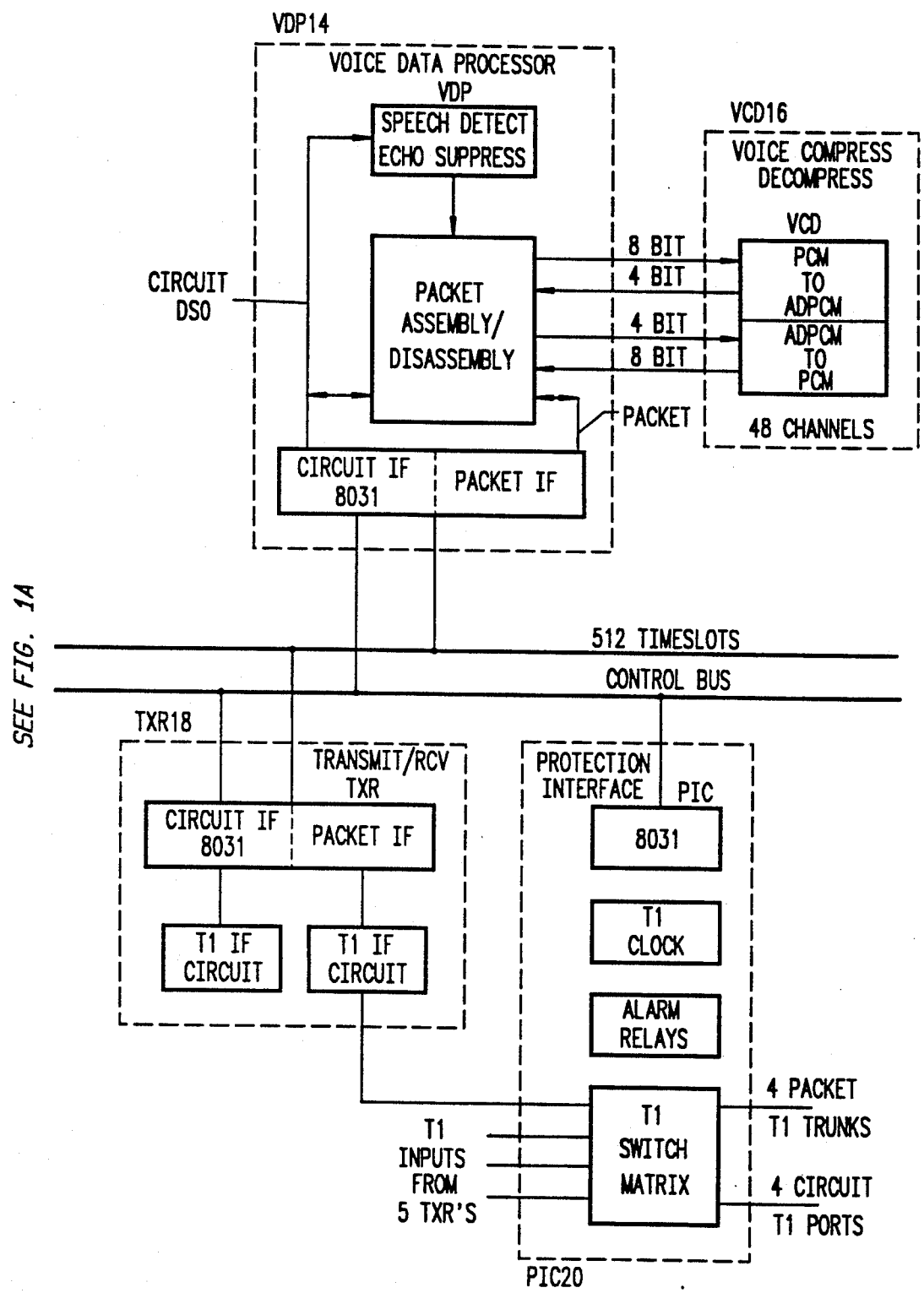
Figure 2A:
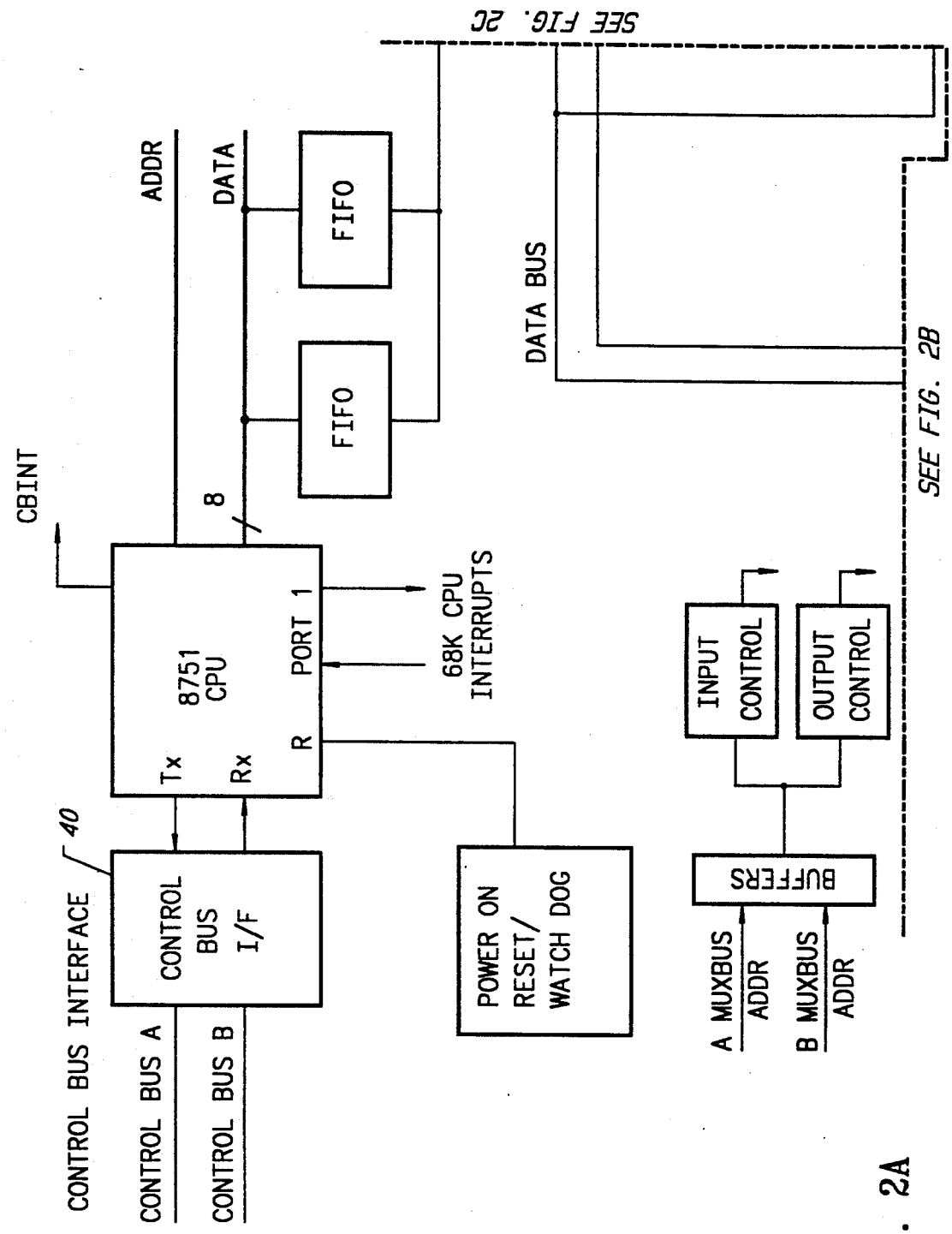
Figure 2B:
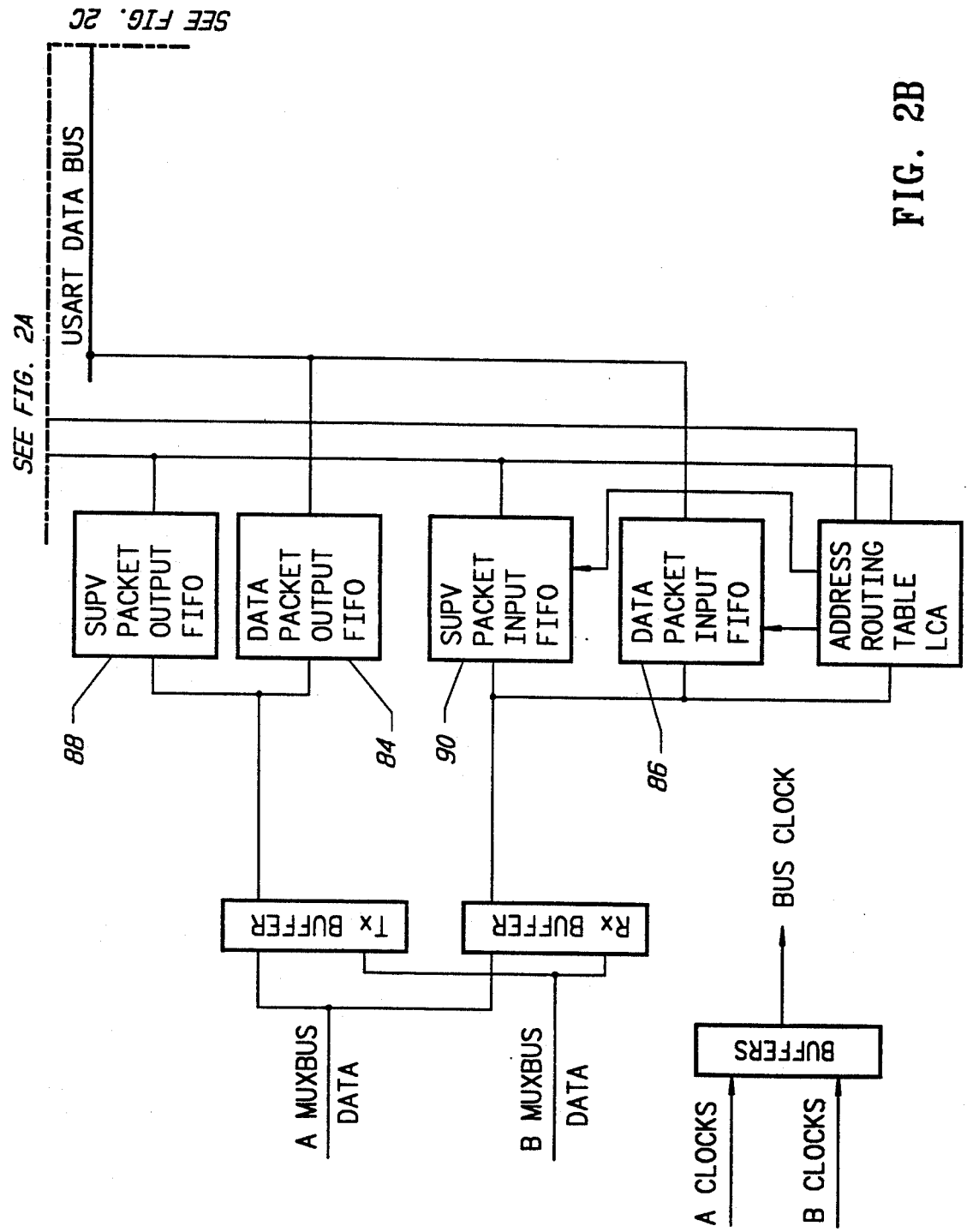
Figure 2C:
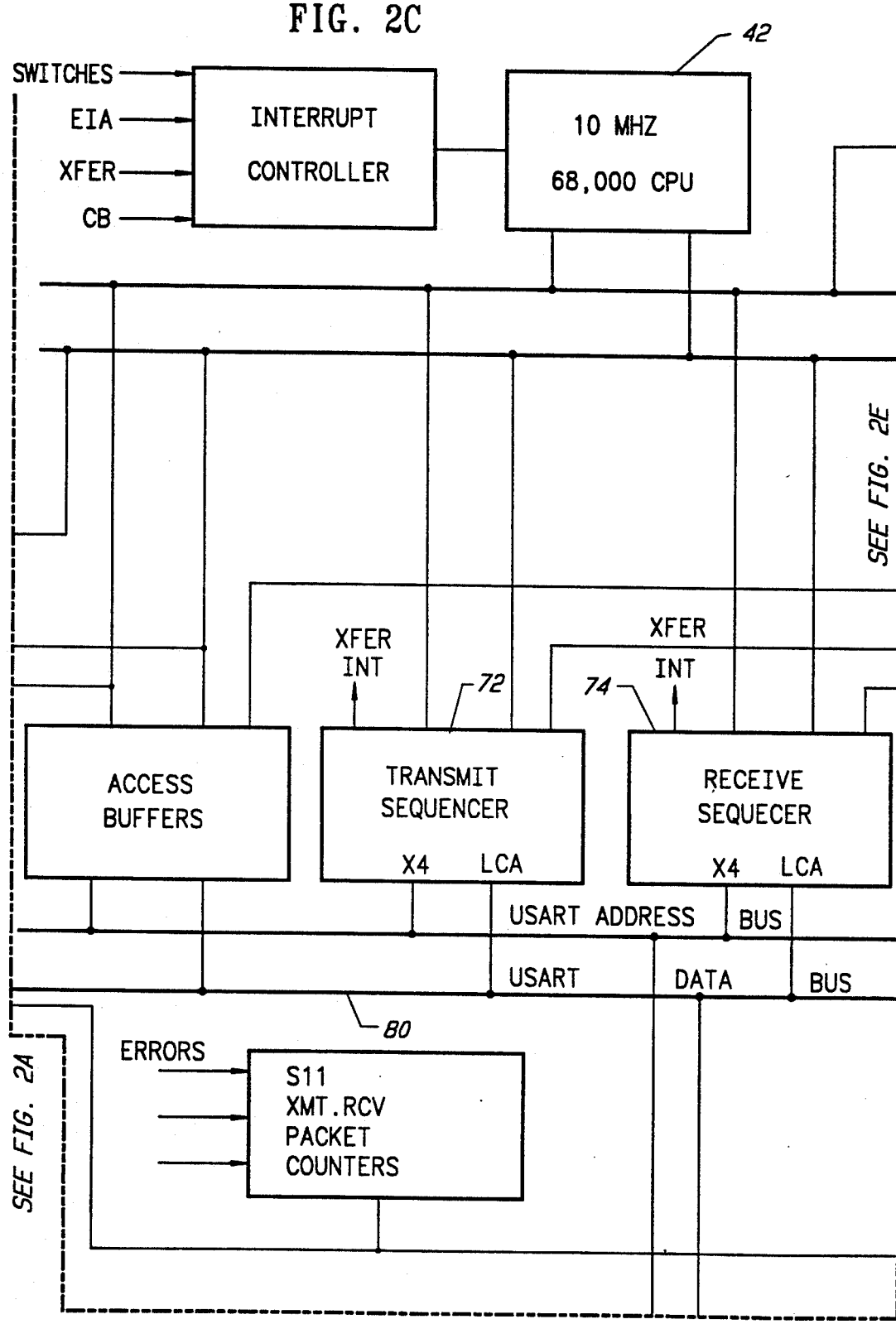
Figure 2D:
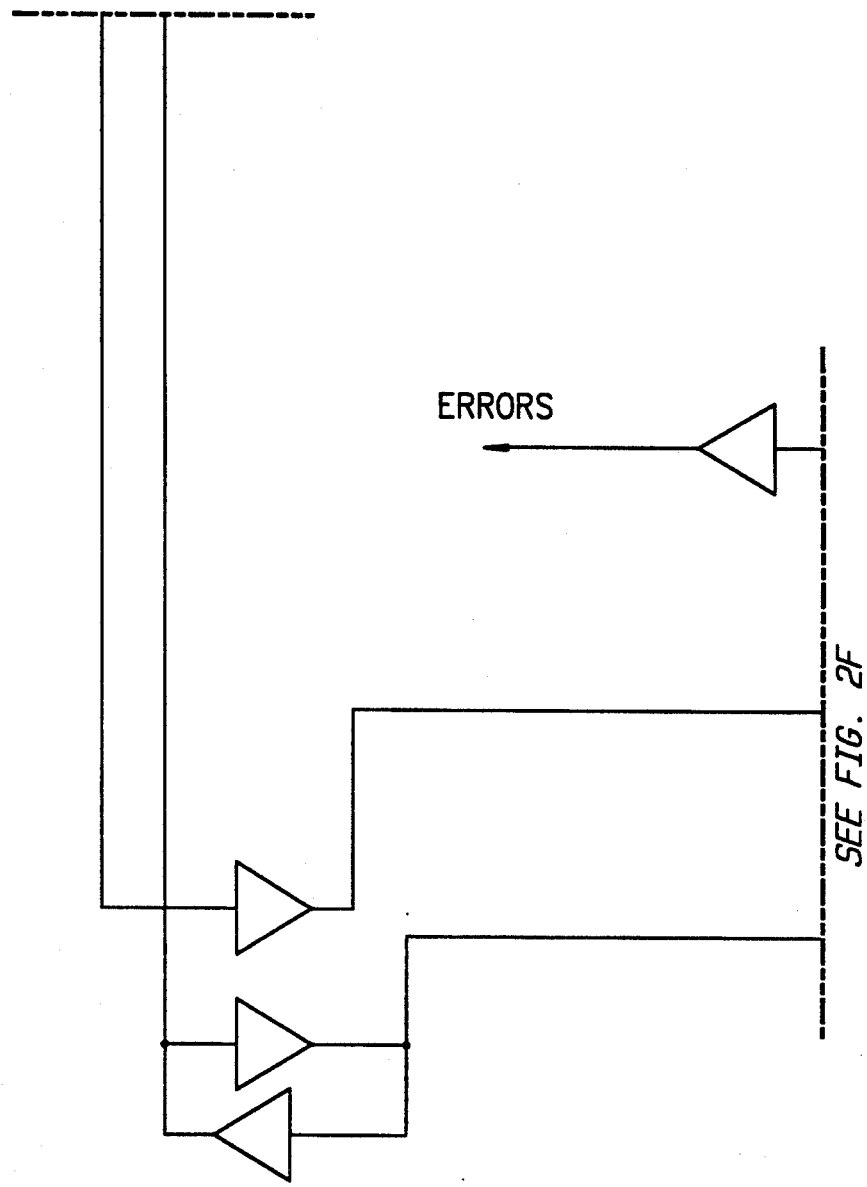
Figure 2E:
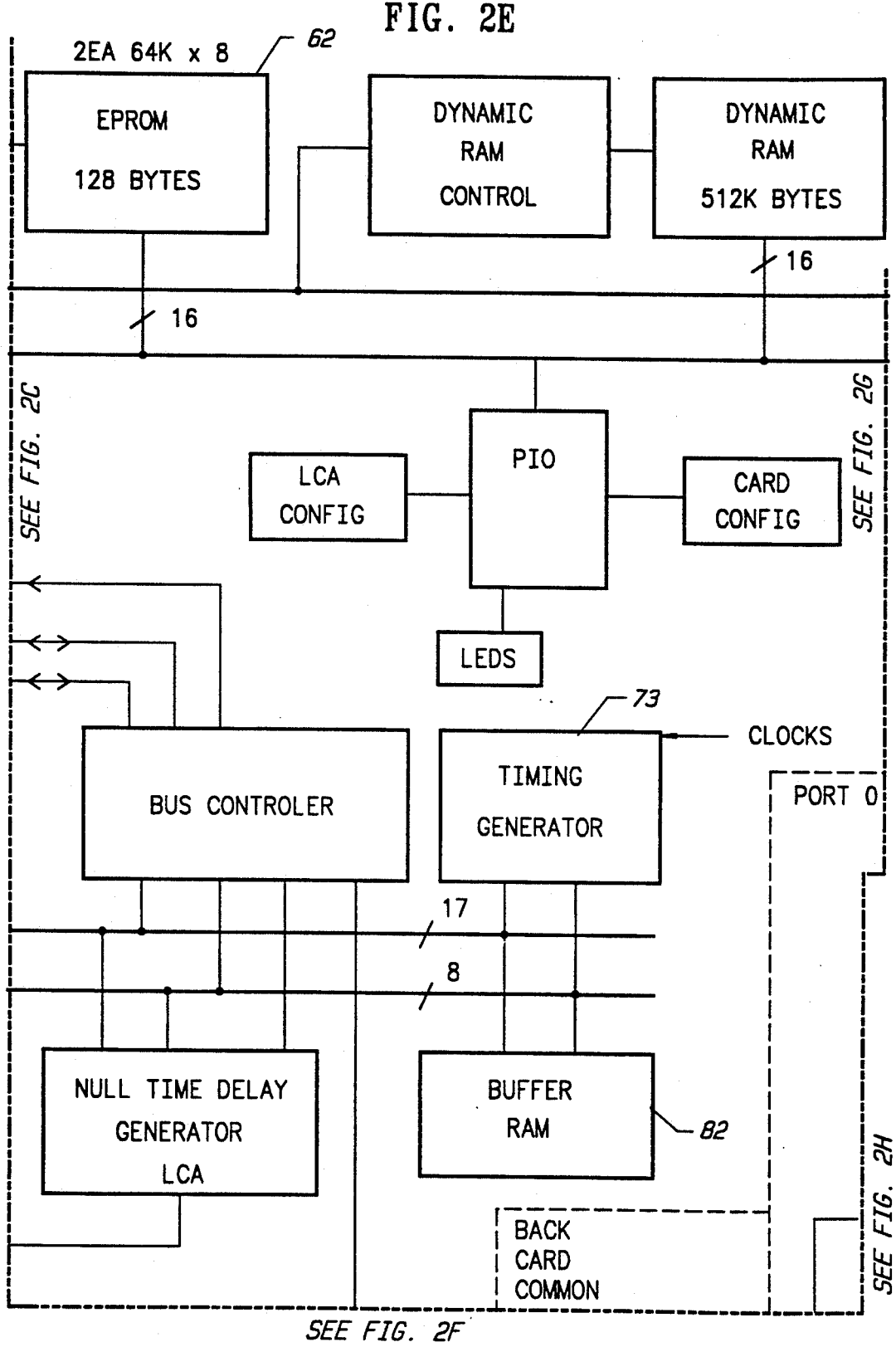
Figure 2F:
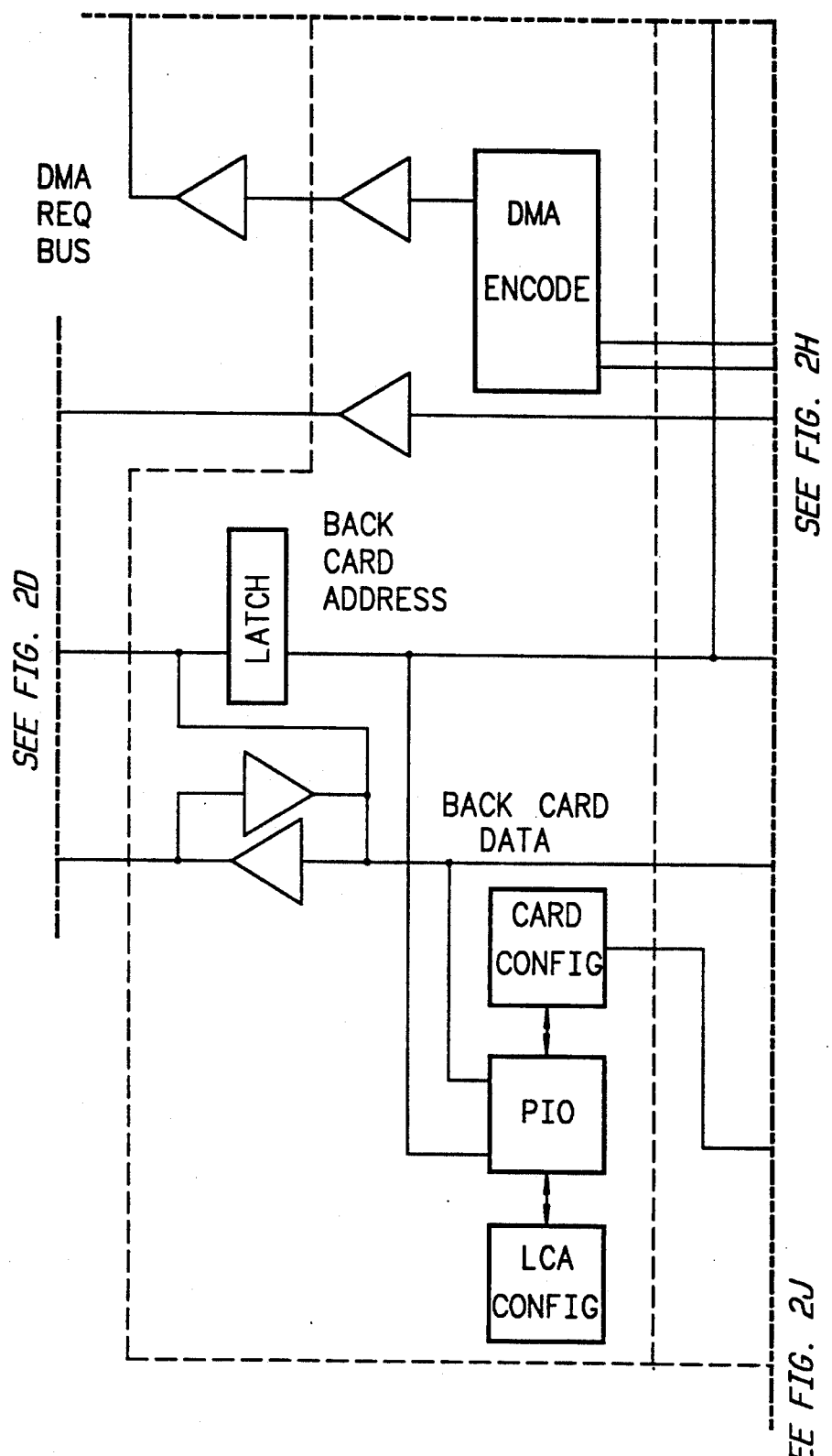
Figure 2G:
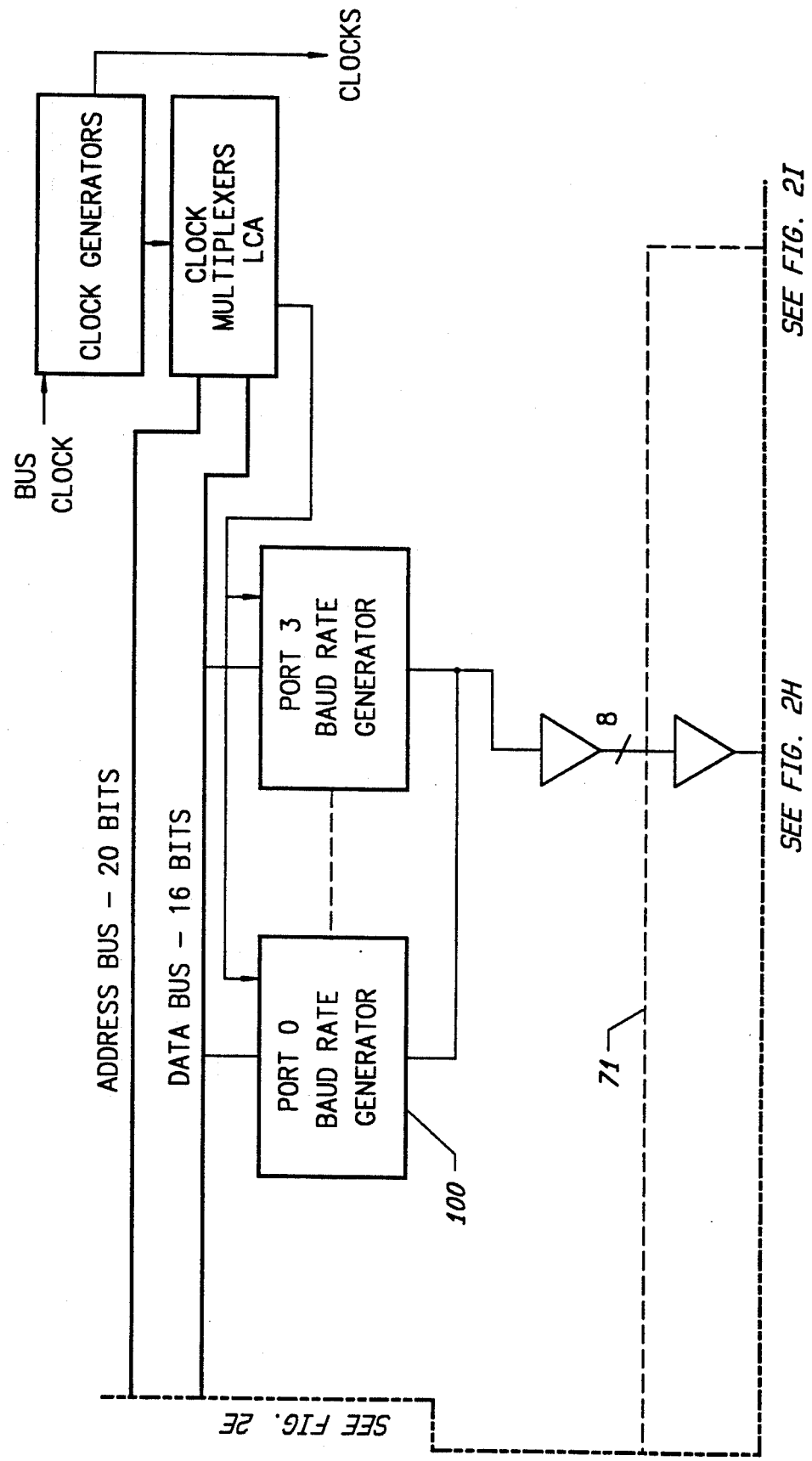
Figure 2H:
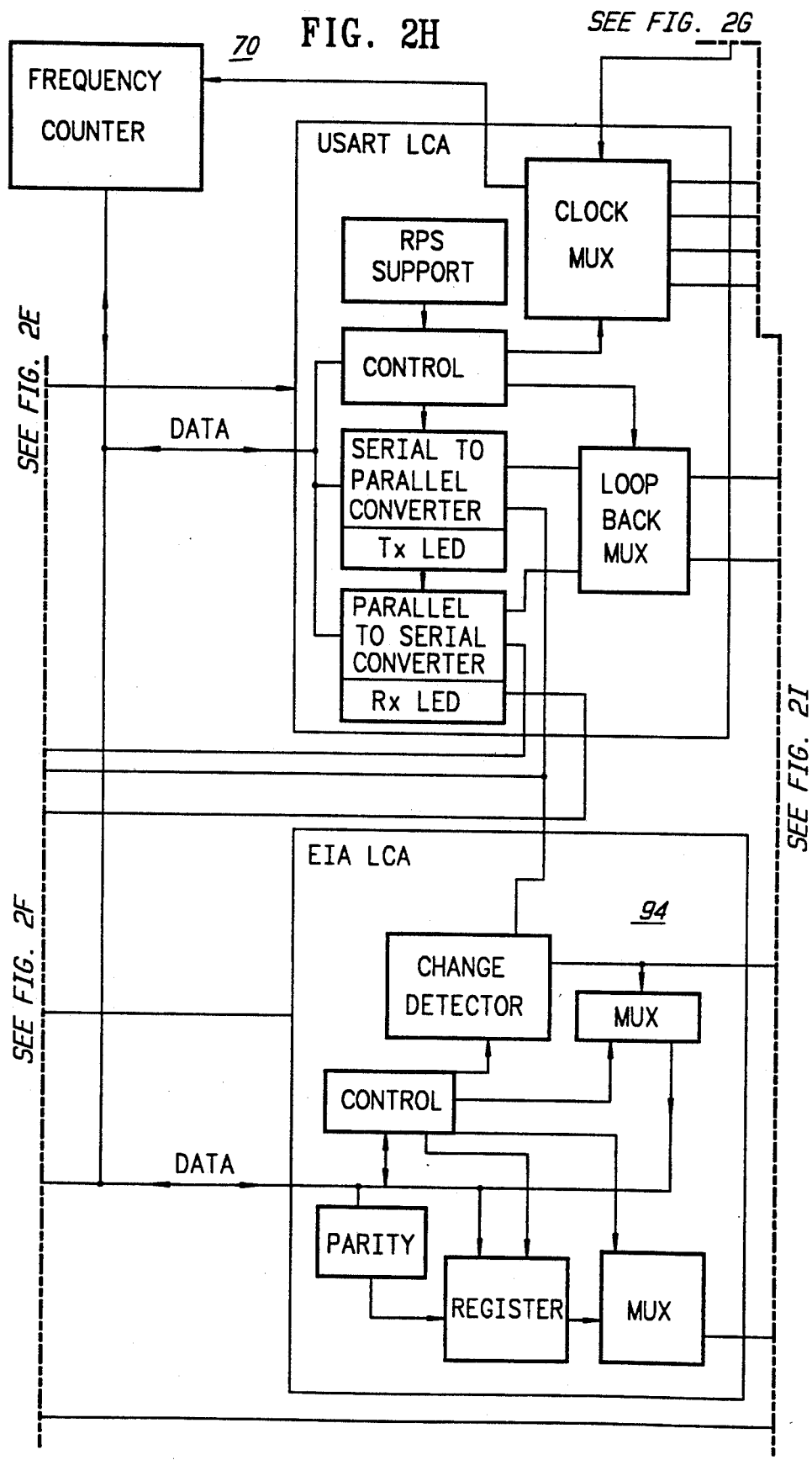
Figure 2I:
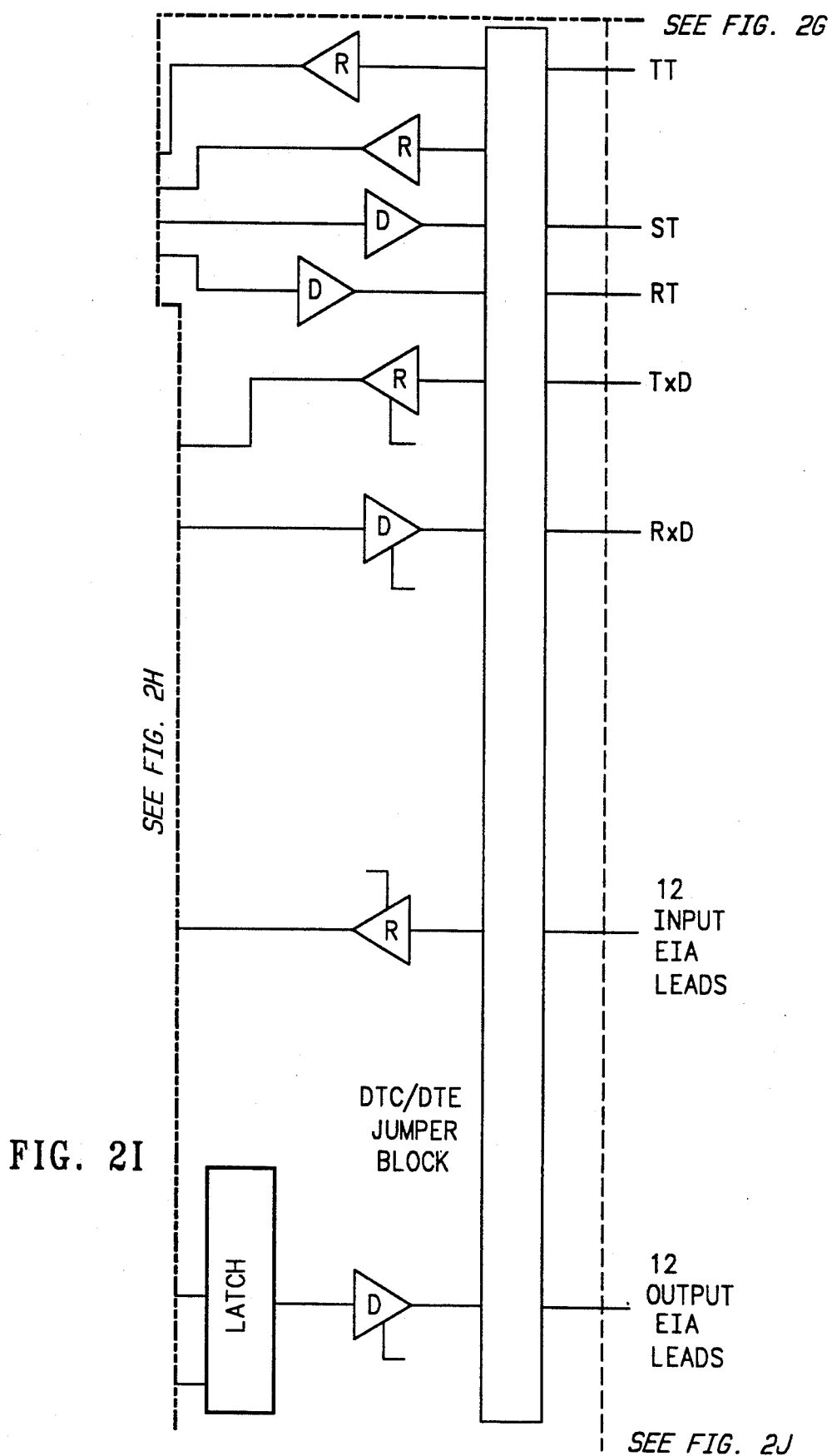

Synchronous statistical multiplexers may be used in conjunction with the SDP 10, but since they do not generate packets which are IPX compatible, all of their subrate channels must be kept together as a bundle and routed together through the network. Individual subrate channels cannot be routed to separate destinations in the network. cl Relation to the Overall System FIG. 1 shows an overall block diagram of the IPX with the Quad Synchronous Data Pad. The SDP 10 resides on both the Muxbus 24 and the Control Bus 26. The IPX Packet Control Card (PCC) 12 controls, configures and gathers status from the SDP 10 via the Control Bus 26. The SDP 10 always works in a packet mode and utilizes a quantity of bandwidth on the Muxbus 24 which is somewhat greater than the sum of baud rates of the four data channels. Bandwidth on the Muxbus 24 is allocated in 168k bit per second chunks. Thus, there are eight chunks of 168k bits per second per packet T1 (1.344 Mbps). The IPX software assigns Muxbus 24 bandwidth when it configures the baud rates of the channels. It assigns enough chunks of 168K bits per second to carry the total for the four data channels. There are 20 T1s worth of bandwidth on the backplane available for voice and data. In addition, some of this bandwidth must be used for interconnecting VDPs 14 to Transmitter/Receiver Cards (TXR) 18 for both directions. Most systems will utilize the IPX expansion shelf capability to house data cards while the first shelf is used for voice cards in the present configuration. The expansion shelf can hold up to 15 data cards because one of the slots is used for a PCC 12.

Data card data packets utilize a slightly different format than voice packets. Thus only data cards can receive data card packets, and data cards cannot receive voice packets. The data card builds data packets and outputs them on the Muxbus 24, where they are received by the TXR 18 and routed to the appropriate packet T1 trunk. At the other end, the reverse process occurs. Thus, the VDP 14 and VCD 16 are not used with data. The data card can generate data packets and control packets. The data packets carry data and fast EIA lead information. The supervisory packets carry slow EIA lead states and isochronous clock frequency information between pairs of data cards.

Functional Summary

Each synchronous data pad provides the following functions:

8751 CPU 40 for interconnecting the SDP 10 to the control bus. The 8751 circuitry includes system reset and background diagnostic functions. The PCC 12 controls the SDP 10 through the control bus 26 by serial messages.

68000 CPU 42 for initializing the other portions of the card, for configuring each channel per instructions received from the PCC 12, for performing the frequency control process for isochronous clock configurations, for slow EIA lead control, and for on-line diagnostic capabilities. The 68000 CPU 42 communicates with the far end of the link via supervisory packets.

Custom USART 44 devices to perform serial to parallel conversion of the data.

Input/Output sequencers 46 for each direction of each channel to fetch data from the USART devices and construct packets, to generate 511 diagnostic test patterns, to generate link monitoring CRC patterns, to verify packet sequence and to fetch fast EIA lead information for inclusion in data packets.

Supervisory packet FIFOs 52 to buffer card to card communications packets for the Muxbus.

Data packet FIFOs to buffer data packetes for the Muxbus.

EIA lead switching and control circuitry 56 to allow EIA leads to be interconnected at the local end, set off or connected to the remote end under software control. A remote "breakout box" capability is implemented by connecting all of the EIA leads to the 68000 CPU 42. The EIA control circuitry is contained on the back card.

Protocol independent "Repetitive Pattern Suppression" (RPS) Proprietary algorithm implemented in hardware and software.

Operational Description

Introduction

FIG. 2 shows a more detailed block diagram of the SDP 10. When power is applied to the card, the 68000 CPU 42 begins executing from its PROM memory 62. It first performs diagnostic tests to verify that the card is operational and then it notifies the 8751 CPU 40 of the test results so they can be reported to the PCC via the control bus 26. It initializes the card by loading the USART transmit and receive sequencers which are programmable Gate Arrays. It must also load the parallel I/0 ports which control the EIA leads, and the USARTs must be initialized by loading their control registers to make them begin receiving serial bit streams and converting from serial to parallel. It must also load device/channel addresses into the Muxbus interface circuitry.

The 8751 processes control messages to and from the PCC 12. When power is applied to the SDP 10, it first performs a self test before reporting the existence and state of the SDP 10 to the PCC 12.

Configuring the Card

The user configures the SDP 10 through the IPX control console which is connected to the PCC 12. PCC software provides for SDP 10 configuration and status screens. The PCC software accepts the user's input and generates messages over the control bus 26. The message packets are received by the 8751 CPU 40 and passed to the 68000 CPU 42 for implementing the configuration of each channel. Refer to the SDP Software Manual for details of the possible card configurations and the PCC screen formats.

When the user requests status information, such as the state of the EIA leads for a particular channel, a control message is issued which requests the particular status information, and it is returned by the 68000 CPU 42 to the 8751 CPU 40, which in turn sends it as a message via the control bus to the PCC 12.

Data Transfers

The IPX must transfer the user data through the network in a transparent fashion. It must not add or delete any characters or bits, and it must keep the EIA lead transitions synchronized as closely as possible with the data. The data can be any protocol, and each channel acts independently. The IPX must simply receive the user data without understanding the protocol being used and packetize it by packing 8 (or 7 plus zero suppression) sequential bits at a time into the bytes that comprise the data packets. The 8 bit boundaries used by the IPX are not related to boundaries used by the actual protocol.

Data is received by the USART LCAs 70 (see FIG. 2) 8 or 7 bits at a time and converted from serial to parallel format. The USART LCAs are initialized to operate in a bit synchronous mode which is not sensitive to data format. Each time the LCA 70 receives a byte it notifies the transmit sequencers 72. There are separate sequencers 72, 74 for each direction of transfer and for each channel. These sequencers are State machines implemented by programmable Logic Cell Arrays. The sequencers 72, 74 and USART LCAs 70 can have different programs loaded by the 68000 CPU 42. They may be configured differently for different applications of the card. The State machines implemented in the Transfer LCAs cause the packets to be assembled and disassembled in the particular packet format configured for the channel. The USART LCAs are also capable of generating 511 pattern sequences for use in diagnostic testing. The Sequencers utilize 32K bytes of static buffer ram to queue the packets during the assembly and disassembly process.

All the Sequencers 72, 74 and the static ram along with the USART LCAs 70 reside on an 8 bit bus 80, the "Sequencer" bus, that is separate from the 68000 bus 80. A separate bus is used so that the aggregate bandwidth of the data transfers (1.344 MHZ*4=5.376 Mbits/sec. in both directions) will not subtract from the 68000 CPU's instruction execution process. When the packets are completely assembled in the static ram 82, they are moved to output packets FIFOs 84 which feed the Muxbus 24 with packets during the timeslots allocated by the channel address control LCA. Outgoing packets are transferred across the Muxbus 24 to the appropriate TXR 18 based on the packet header address field and then routed to a Packet T1 trunk to another node. At the receiving node, the packets are received by the TXR 18. If the node is the final destination and not a tandem node, they are routed to the Muxbus 24 and received by an SDP input packet FIFO 86. The input packet is disassembled by a receive Sequencer 74 and stored in the 32K byte static RAM for outputting to the USART LCA 70 a byte at a sample time.

The SDP 10 handles EIA leads in two modes of operation: Interleaved and Normal. In the Interleaved mode, up to seven of the leads can be sampled with close synchronization to the data and their state transferred as every other byte of the packet. Thus in this Interleaved mode, every data sample has an associated byte of EIA lead state information. The Interleaved mode utilizes a significant amount of of bandwidth for EIA lead handling, but it assures that the leads are synchronized to within one data sample time, which is required by certain data communication equipment. On connections that are 128K bps and below, the data arrives from 0 to 9 bits behind the EIA controls. Above this rate the data arrives from 6 to 16 bits later than the controls. In the Interleaved mode, the transmit sequencer 72 that assembles the packet also fetches the state of the seven EIA leads with each sample (see FIG. 2). The sequencer bus 80 is buffered and extended to the back card, where the EIA lead handling circuitry is located. Note that the Interleaved EIA feature is not supported for RPS connections.

In the Normal mode, all 12 input leads are monitored for state changes at up to 20 times per second. If a change is detected, the 68000 CPU 42 notes the state of the lead that transitioned and forms a supervisory packet containing a message for the SDP 42 at the other end of the network. The user can set the maximum number of supervisory packets in a non-isochronous connection to any value within the range of zero to twenty packets per second. The 68000 CPU 42 outputs the packet to the supervisory packet output FIFO 88 (see FIG. 2). The control packet goes to the TXR 18 across the Muxbus 24 and to the packet Tt trunk in the same manner as data packets. At the far end of the network, the supervisory packet is received by the TXR 18 and routed to the SDP supervisory packet input FIFO. The 68000 CPU 42 receives the supervisory packet, interprets it and loads the appropriate bits in the EIA LCA 94 register used to drive the EIA output leads.

The EIA lead circuitry on the back card (see FIG. 2) is implemented by a programmable Logic Cell Array. It allows the CPU to set any of the 12 output leads to an "on" or an "off" state. This allows the CPU to implement the normal EIA lead mode of operation. There is a separate programmable EIA LCA 94 per channel. They are programmed or configured in a manner similar to programming a PAL, or a PROM. In other words, an array of 1's and 0's is loaded to cause their logic elements to be interconnected.

Isochronous Clocking calculation Theory

Frequency Measurement

Frequency measurement using bit counters and system reference clocks:

Definition: Bits are the count of user (or external) clock transition. Ticks are the count of reference frequency (or system) clock transitions.

f = frequency in bits per second
b = bits counted in a 10 msec. interval
t = ticks of the reference clock in that same interval
k = ticks of the reference clock per second (in this example, 579.000)

Then measured frequency is $$f = \frac{kb}{t}$$

For example, $$9600 \text{ baud} = \frac{(579 \text{ KHz}) \cdot (96)}{5790} = 9600 \text{ Kz}$$

Hardware Frequency Generation g = generated frequency
c = group clock selector
v = vernier adjustment to PIT
r = baud rate divisor $$\text{group clock selector} \frac{\text{group clock frequency}}{579,000 \text{ ticks per second}}$$

$$c = 14 \text{ or } 16$$

$$\text{generated frequency} = \frac{\text{group clock selector} \cdot (\text{Vernier} - 2)}{\text{Vernier} \cdot \text{baud rate divisor}}$$

For example:

$$9600 \text{ baud}: \frac{9264000 \text{ hz} \cdot (386 - 2)}{384 \cdot 960} = \frac{9216000}{960} = 9600 \text{ Hz}$$

Isochronous Clock Generation

It is known how to calculate a frequency given bit count and time measurements. It is also known what frequency a vernier and baud rate divisor would generate for a given group clock. The next step is to solve the equations so as to yield baud rate divisors and verniers from bit counts and time measurements.

Set generated frequency equal to measured frequency:

$$g = \frac{c(v-2)}{vr} = \frac{kb}{t} = f$$

so that

-continued $$\frac{bk}{tc} = \frac{v-2}{vr}, \frac{bkr}{tc} = \frac{v-2}{v}$$

$$\frac{bkr}{tc} = 1 - \frac{2}{v}, \frac{-2}{v} = \frac{kbr - tc}{tc}$$

$$v = \frac{2tc}{tc - kbr}$$

It is known how to calculate a vernier setting to produce a frequency given the bit and tick counts, along with a baud rate divisor and group clock. The problem is to find a good way to arrive at the baud rate divisor. Making use of the knowledge that the vernier center-point is 386, substitute the above equations and:

$$r = \frac{tc - \frac{2tc}{386}}{b}$$

Having established an "ideal" baud rate divisor, the vernier can be solved again, and compute an appropriate vernier to accurately reproduce the desired frequency.

Isochronous Clocking Calculation: Adjustments

For f<<k (frequency much less than reference clock), the uncertainty in the calculation of the frequency can be described:

B = nominal bit rate
U(b) = 1
U(t) = $k/B$

What this means is that by getting a measurement of "b" bits, the reality is somewhere between "b" and approaching "b+1" as a limit. Likewise, the tick measurement, which ideally would coincide with the edges of the bit counter, is subject to slop such that "t" is somewhere in a field extending almost k/B bits on either side of the measured value.

Limits of 32-bit Math

To work around the roundoff errors associated with 32 bit integer math, a large amount of "historical" information is kept about the "local" and "remote" bits and ticks measurements. For long term accuracy, a ten second running sum is accumulated for both end's bits and ticks. For detecting short term variations, a 150 millisecond running sum is accumulated for both end's bits and ticks.

A very accurate low level indication of how close the local calculations are to regenerating the "locked" frequency can be obtained by maintaining a "bit balance" and a "tick balance" between each end. These are derived by doing a running sum of the differences between the local and remote bits, and similarly a running sum difference of the ticks. This also helps to maintain a "bit-in bit-out" relationship between the remote and local clocks. When the local end has "caught up" with the remote end and the regenerated baud clock's vernier is on the "center point" the bit and tick balances drop to zero. This is the primary technique that is used during the "fine tuning" portion of the tracking code to adjust for calculation errors that occur when deriving the baud rate divisor and vernier values.

"Variable Speed" or Adaptive Input Clock Tracking

In theory, just the long term running sum values could be used to calculate the vernier and rate divisor values, but the techniques would be extremely slow to respond to any major changes. To compensate for this and allow a faster frequency "lock" capability, the firmware "shifts" between different "tracking" modes. These are called WAITING PRE-TRAINING and FINE-TUNE.

If frequency measurement information from the other end says that the clock input rate is less than about 500 baud, the firmware is kept in the WAITING state. If at least one sample is received that is $>=500$ baud, the PRETRAINING state is acquired. Once two consecutive "reasonable" baud rate samples are detected, the TRAINING state conditions are met. Here is where the long and short term sums start being collected. The SHORT term history sums are used to calculate a more responsive "quick" estimate of the baud rate divisor.

Under stable input clock conditions, the baud rate divisor value should essentially be a "constant" in the vernier equations. Therefore, if the long term history baud rate divisor and the "quick" calculated version vary by more than 12.5%, this condition causes a transition back into the PRE-TRAINING state. When this occurs, any previous long term history sums are thrown away.

Long Term Accuracy

Going in the other direction, the qualifications to get into the FINE-TUNE state require that there be no greater than a 0.4% change between consecutive frequency calculations using the long term histories. During the FINETUNE state, calculations for a new (or update) version of the PIT baud rate divisor and vernier are made using the collected LONG term history bits and ticks sums. These are adjusted by adding in the bit balance and tick balance factors to keep the baud rate "spot on" the remote input frequency.

Underspeed and Null Time Delay Considerations

Whenever the adaptive tracking state machine is in the PRE-TRAINING or WAITING states, the number of data bytes in the received data buffers are changing because the local and remote rates are substantially different. This is undesirable for maintaining a constant delay through the network connection. Eventually, the buffer will either spill or underflow (at worst) or give a random delay value (at best) unless the pointers values are maintained. When the port is in either of these states, the Receive Sequencer LCA is disabled from loading bytes into the buffers. When the state transition from PRETRAINING to TRAINING occurs, the LCA is enabled and the Null Time Delay counter is restarted to maintain the proper delay value.

Clock Modes

The SDP supports three fundamental clocking configurations: Normal, Split and Looped Clocking. When clocks must be received from the user equipment and passed through the IPX network, Isochronous clocking circuitry is provided to measure the frequency of the incoming clock and adjust the outgoing clock at the other end of the network. FIG. 2 shows the 8254 counter timer which is used to measure the clock frequency. RxC or XtC is selected as an input to the timer counter. The timer counter measures the frequency. The 68000 CPU reads the counter timer to get the frequency information to form a supervisory packet to send to the other end of the network at a fixed rate of 20 times per second. At the other end, a software controllable baud rate generator 100 is loaded by the 68000 CPU 42, receives the supervisory packet and adjusts the output frequency to match the input. The baud rate generators 100 are adjustable in very small increments by loading vernier counters, which cause the baud rate frequency to be adjusted by deleting clock pulses. The baud counter circuitry (see FIG. 2) is clocked from a base clock which is phase locked to the particular T1 clock that has been selected by the system as the master clock. At the far end of the network, the baud rate generator can be used to drive any of the three possible clocks, TxC, RxC and XtC under software control. If the isochronous clocking mode is not used, the baud rate generator 100 is loaded once by the 68000 CPU 42 instead of continuously adjusted.

Figure 3:
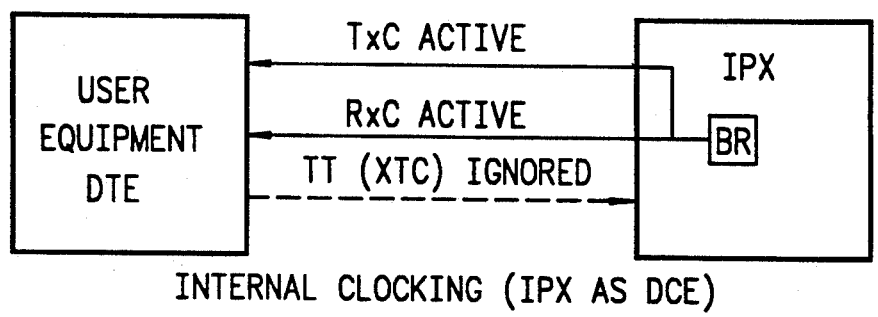
FIGS. 3 and 4 show DCE and DTE clock configurations, respectively.
Figure 3:
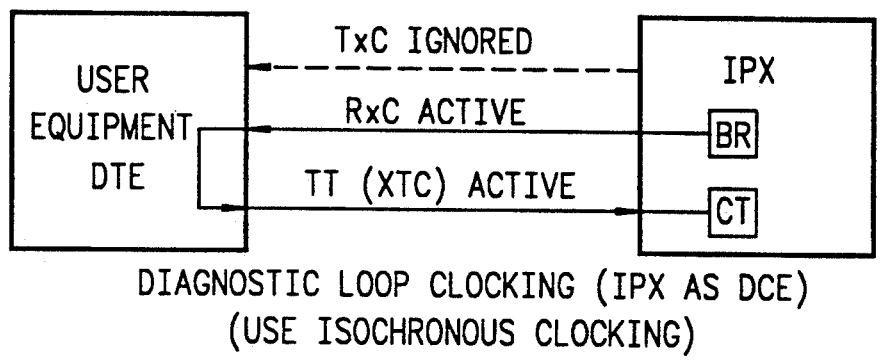
Figure 3:
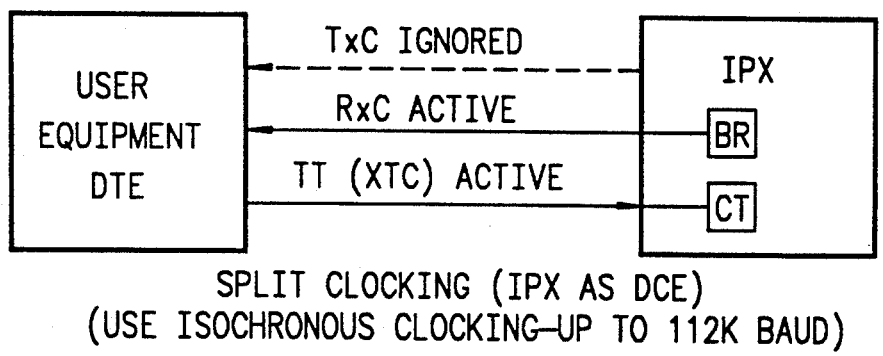
Figure 4:
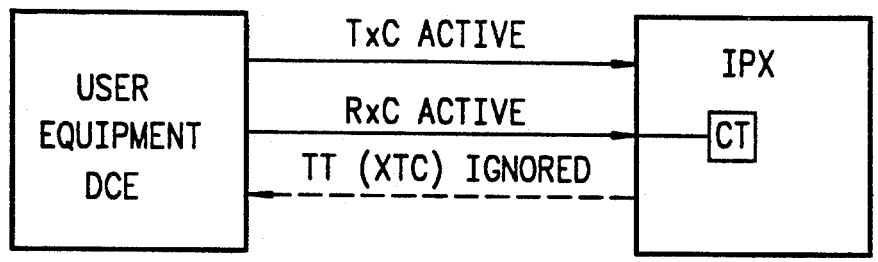
Figure 4:
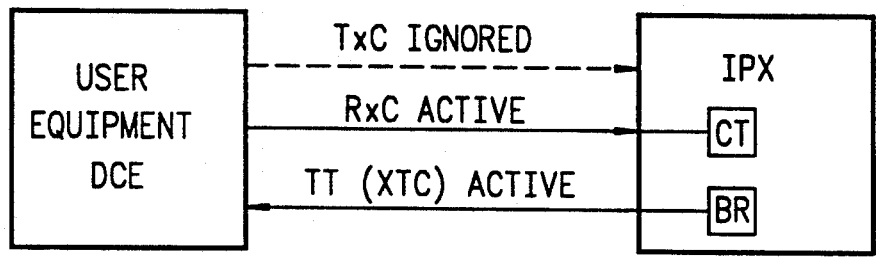
Figure 4:
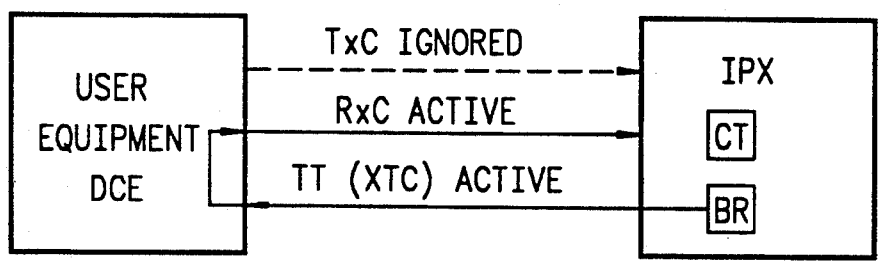

The baud rate circuitry described above provides the capability to perform isochronous clocking on one input per port. It does not support two isochronous clock inputs in the same direction as would be required by some modems which output both the RxC and TxC clocks totally independently. It is designed to handle broadcast configurations. It is designed to handle all of the clock configurations summarized in FIG. 3 for the case of the IPX configured as Data Communication Equipment (DCE), and FIG. 4 summarizes the DTE configurations. Note that when the IPX receives a non-network synchronous clock, it uses the isochronous mode. When the clock it receives is looped back in the user's equipment and was originated in the IPX, where it is a constant frequency, the "looped" clocking mode can be used any baud rate. When the incoming isochronous clock was sourced by the user's equipment and is varying, the upper limit is 112K baud.

Baud Rate Generation and Isochronous Clocking

The Synchronous data PAD (SDP) functions with a wide range of baud rate and clocking configurations. Each port provides data transfer rates from 1.2K to 1344K baud. Synchronous (internally sourced) and Isochronous (externally sourced) clocking modes are also supported.

This section deals with how the SDP derives and generates both the network synchronous and recovered isochronous clock sources.

Overview

Figure 5:
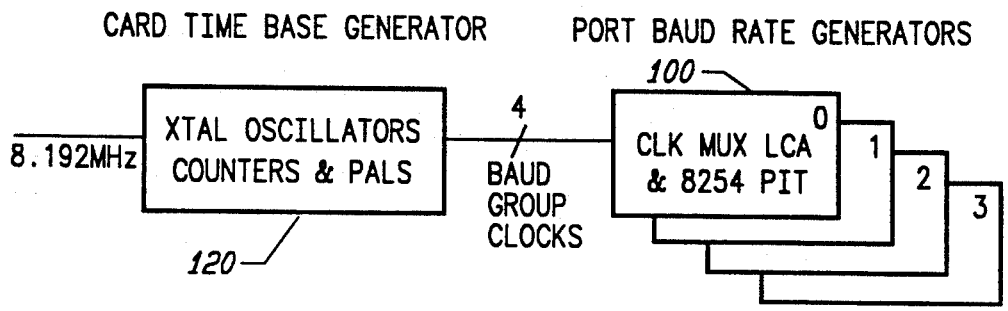
FIG. 5 shows a diagram of baud rate generation circuitry of the SDP of FIG. 2.

The top level picture of the baud rate generation circuitry of the SDP appears in FIG. 5.

The Time Base Generator 120 produces four different "Baud Group" frequency sources from the network synchronous 8.192 MHz clock. To derive a specific baud rate, a port Baud Rate Generator 100 selects one of the four Time Base signals and divides it down to produce both Transmit and Receive clocks to be used (if necessary) by the USART LCA 20 of FIG. 2.

Figure 6:
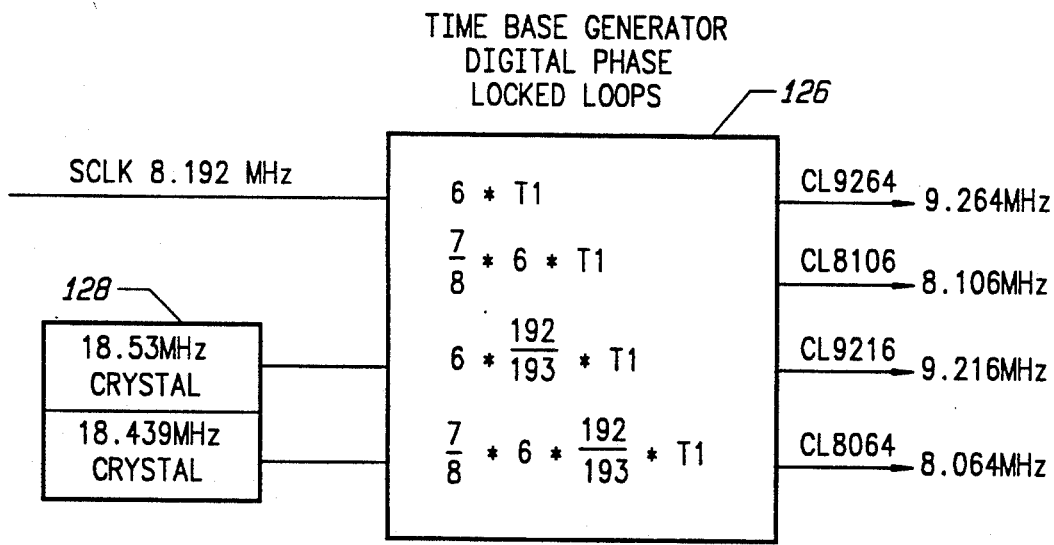
FIG. 6 shows a diagram of a time based generator which forms a portion of FIG. 5.

There is only one Time Base Generator circuitry block on the SDP. FIG. 6 shows the next level of detail for the common Time Base Generator 126.

The first stage produces a "non-square wave" version of the Baud Group Clock. The second uses the crystal oscillators 128 to derive an evenly spaced transition waveform ("square wave") to minimize clocking "jitter" on the output baud group clocks.

Port Level Details

Figure 7:
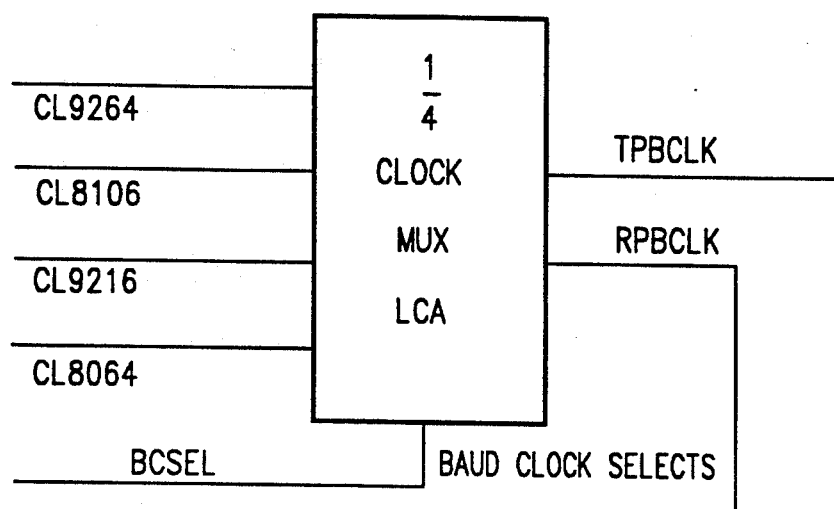
FIG. 7 shows a base clock selection diagram.
Figure 7:
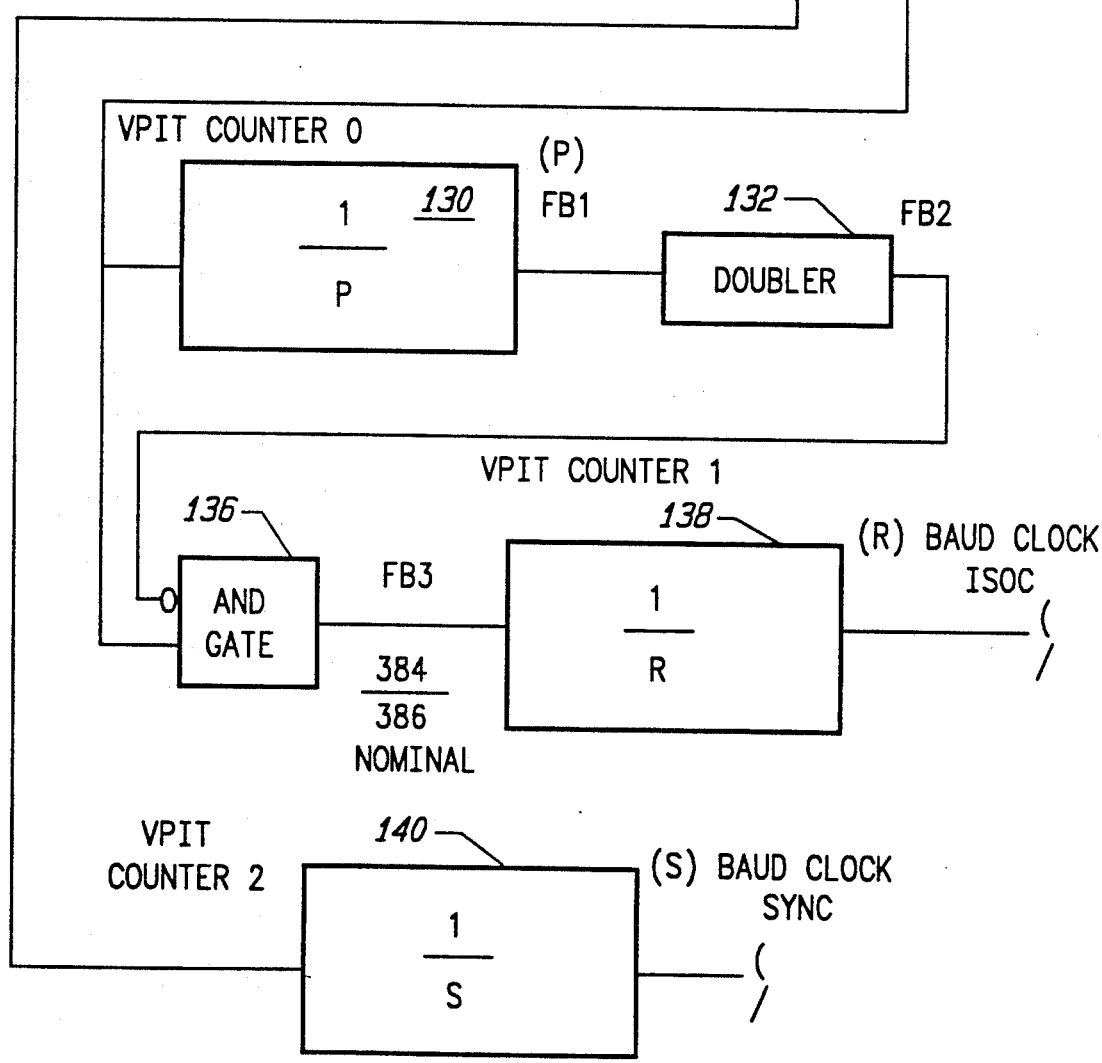

FIG. 7 details the Port Baud Rate Generator block diagram at the next lower level.

The Transmit Baud clock is where the SDP locally regenerates an isochronous clock frequency derived from the remote end of the connection. The variable portion of the baud rate generator is supplied by a Vernier counter 130 (that divides by the value P), a frequency doubler 132 (for increased accuracy), and "clock deletion" gate 136 (that produces a frequency proportional to P-2/P).

This Vernier controlled frequency (signal line FB3 in the FIGURE) is then routed to a (R) Transmit Clock Baud Constant divider 138. The combination of the two counters and the external "pulse deletion" hardware produce a very fine "granularity" variable frequency source for use as a USART transmit clock. By continuously updating the value in the Vernier counter 130, the transmit clock can be phase locked to the receive clock information from the remote data pad. Over a limited range, the resulting baud rate can be varied in increments as small as 0.0013 percent or 13 PPM. The baud constant counter value is loaded once when the port is initialized.

For cases where the card sources the receive clock, the receive baud constant counter (S) 140 is loaded with the same value as the transmit baud constant PIT (R). There is a fixed divide by 192/193rd's function in front of the receive baud constant counter to take the place of the Vernier counter on the transmit side.

Figure 8A:
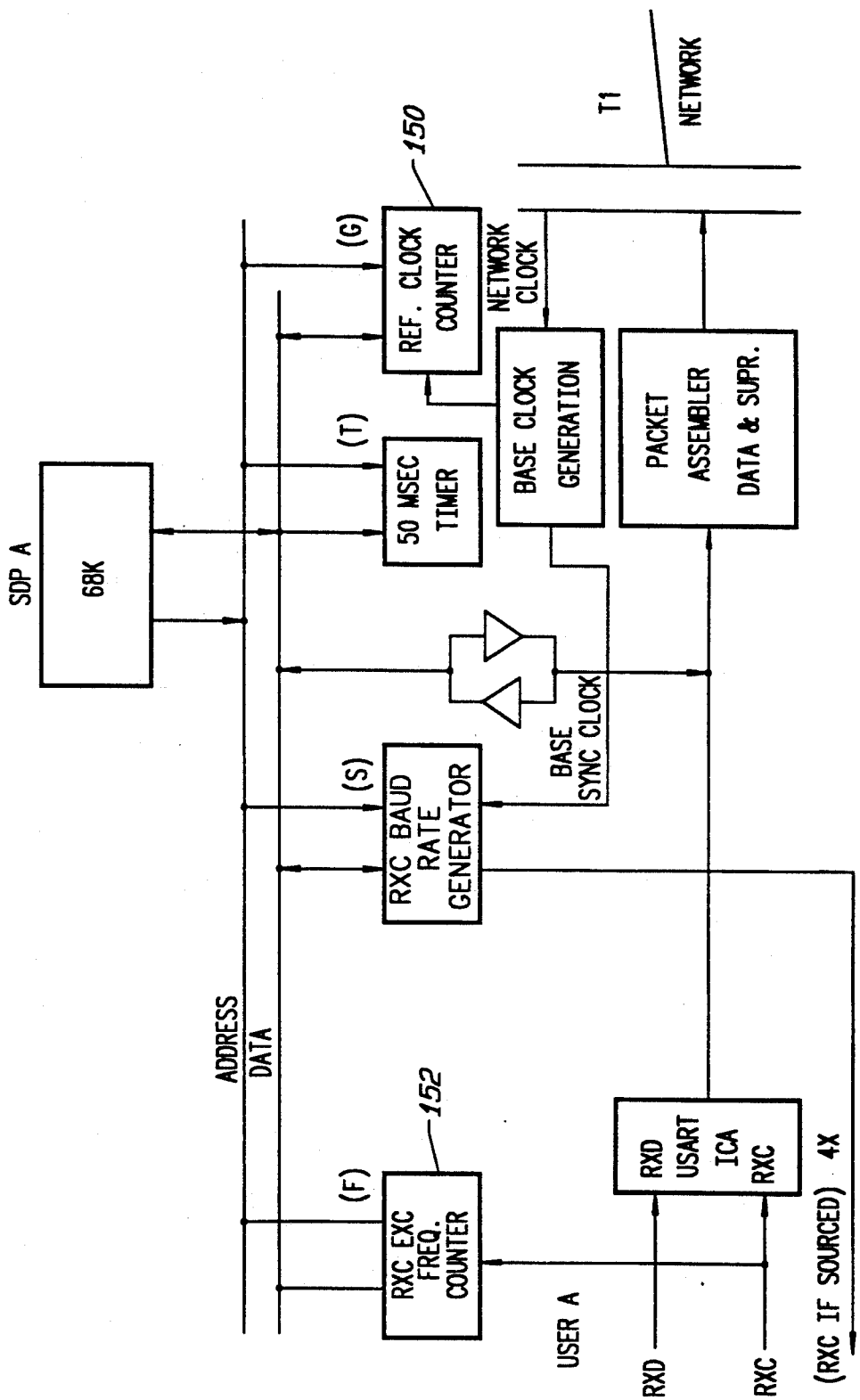
FIGS. 8A through 8C show a diagram of counter circuits used for frequency measurement.
Figure 8B:
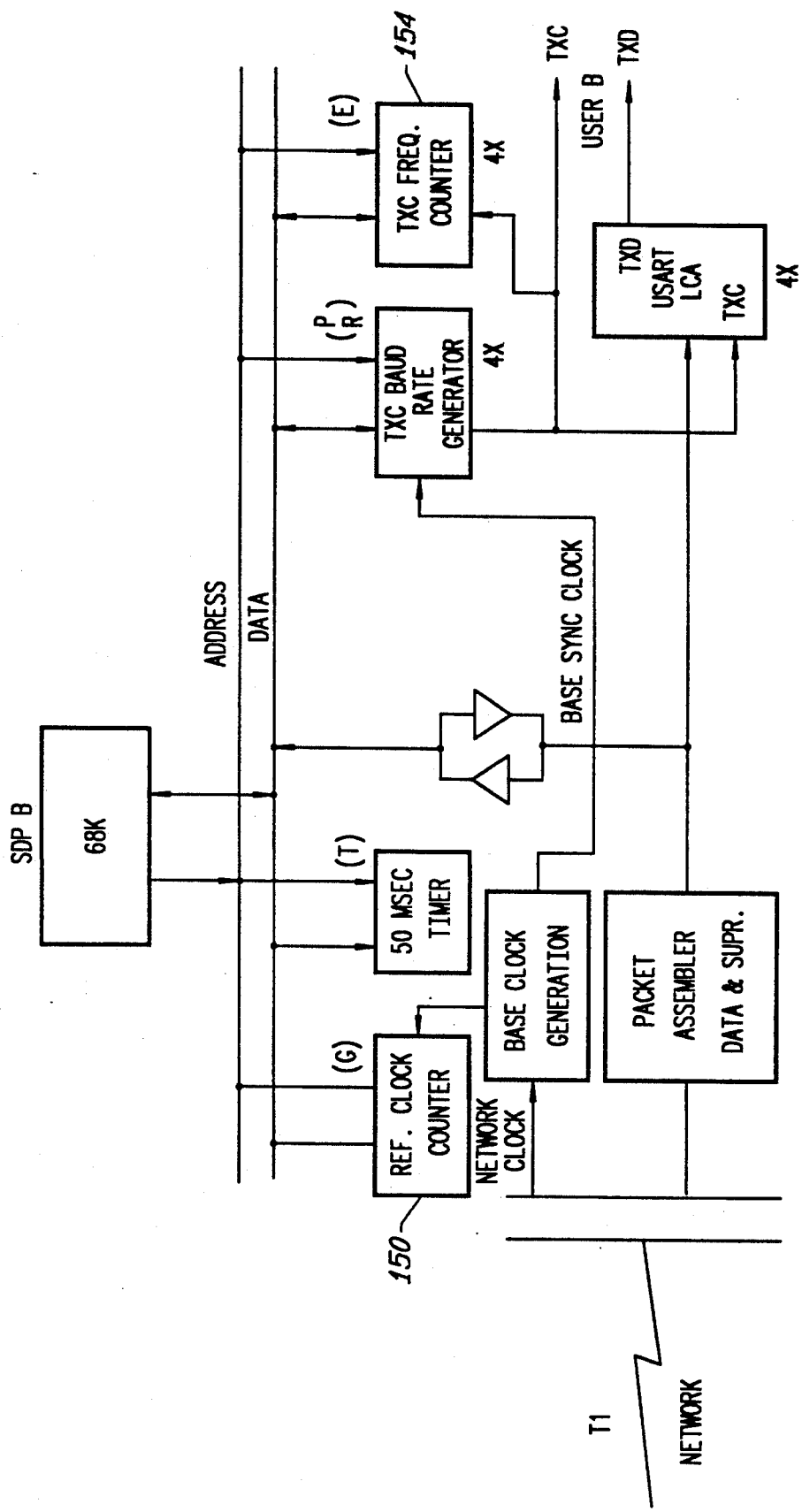
Figure 8C:
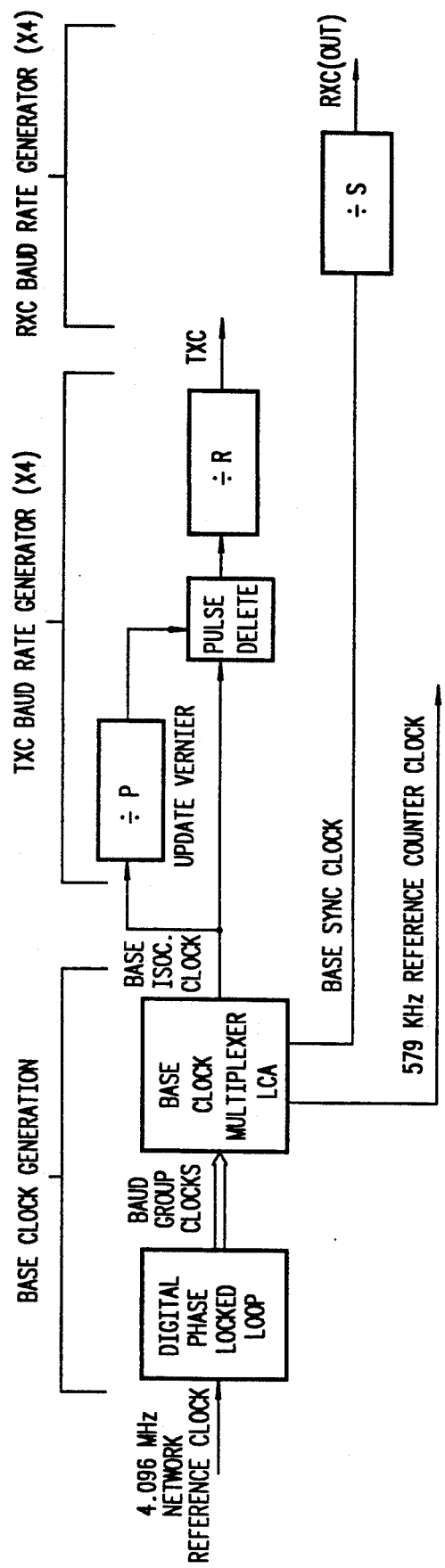

As referenced in FIG. 8, three other counters are used for frequency measurement: Reference Counter (G) 150, Receive Frequency Counter (F) 152 and Transmit Frequency Counter (E) 154. Time Interval measurement information is acquired from Reference Counter (G). The clock supplied to Counter G is derived from the Network-wide T1 reference source, and therefore it provides a common time interval reference between SDP A and SDP B. Frequency measurement information from Counter F and Time Reference information from Counter G is sent via Supervisory packets from SDP A to the remote Data Pad (SDP B) and used to update the Vernier value loaded into the Transmit Baud Rate PLL. Frequency measurement information from CounterE and Local Time Reference information from SDP B's Counter G is used to verify that the aggregate number of bits are correctly transmitted by the USART LCA.

Frequency Counter E. Frequency measurement information from counter F is sent via control packets to the remote data pad and used to update the Vernier value loaded for the transmit baud rate PLL. Frequency measurement information from counter E is used to verify that the aggregate number of bits are correctly transmitted by the SCC.

Sample Baud Rate Derivation

As an example, here are the steps involved in generating a 64000 isochronous baud rate source. FB1 through FB4 are intermediate signal names that are used below to clarify different stages in the generation process. CL9264 is selected for PBCLK because it is an integral removed as part of the Vernier control process. (If a 64K bps synchronous source was required, the CL9216 source would be selected and the 192/193rd's stages would be disabled).

The Vernier VPIT counter 0, nominally divides PBCLK by P=386. This is the first step in deriving the variable 192/193rd's clock for the USART transmitter. Dividing by 386 instead of 193 effectively doubles the level of control resolution on the resulting frequency.

The FB1 signal's center point frequency is 24000 Hz. The frequency doubler circuit converts this to FB2=48000 Hz.

The digital "pulse deletion" circuit (P2/P) takes this evenly spaced Vernier counter pulse train and produces the required 384/386th's of 9.264 MHz center point frequency (FB3=9.216 MHz). Another way of looking at the process is that for every 9,264,000 pulses of CL9264, the pulse deletion circuit "subtracts" 48,000 pulses, resulting in 9,216,000 pulses (per second) being produced at FB3.

The divider value needed to derive 64000 bps from 9.216 MHz is 144. Therefore, 144 is the value loaded into VPIT counter 1, for the transmit baud rate constant stage to produce a 64K bps transmit baud rate. If necessary, the receiver baud clock source PBCLK is prescaled by a fixed 192/192rd's stage to produce FB4=9.216 MHz. A value of 144 is also loaded into VPIT counter 2, for the receive baud rate constant (S) divider to derive a 64K bps receive baud rate.

To incrementally increase the resulting USART transmitter baud rate, a value of 387 can be loaded into the Vernier count register. PBCLK will then be prescaled by 385/387th's (FB3=9264000*385/387th's 9216124.031). The rate changes to 9216124.031/144=64000.8613 bps. Similarly, decreasing the Vernier value to 385 will cause the prescaler ratio to be 383/385. (9264000*383/385=9215875.325). The rate decreases to 9215875.325/144=63999.1324 bps.

The measurement and updating of the PLL control system is implemented in the Motorola 68000 firmware.

Packet Formats

Figure 9:
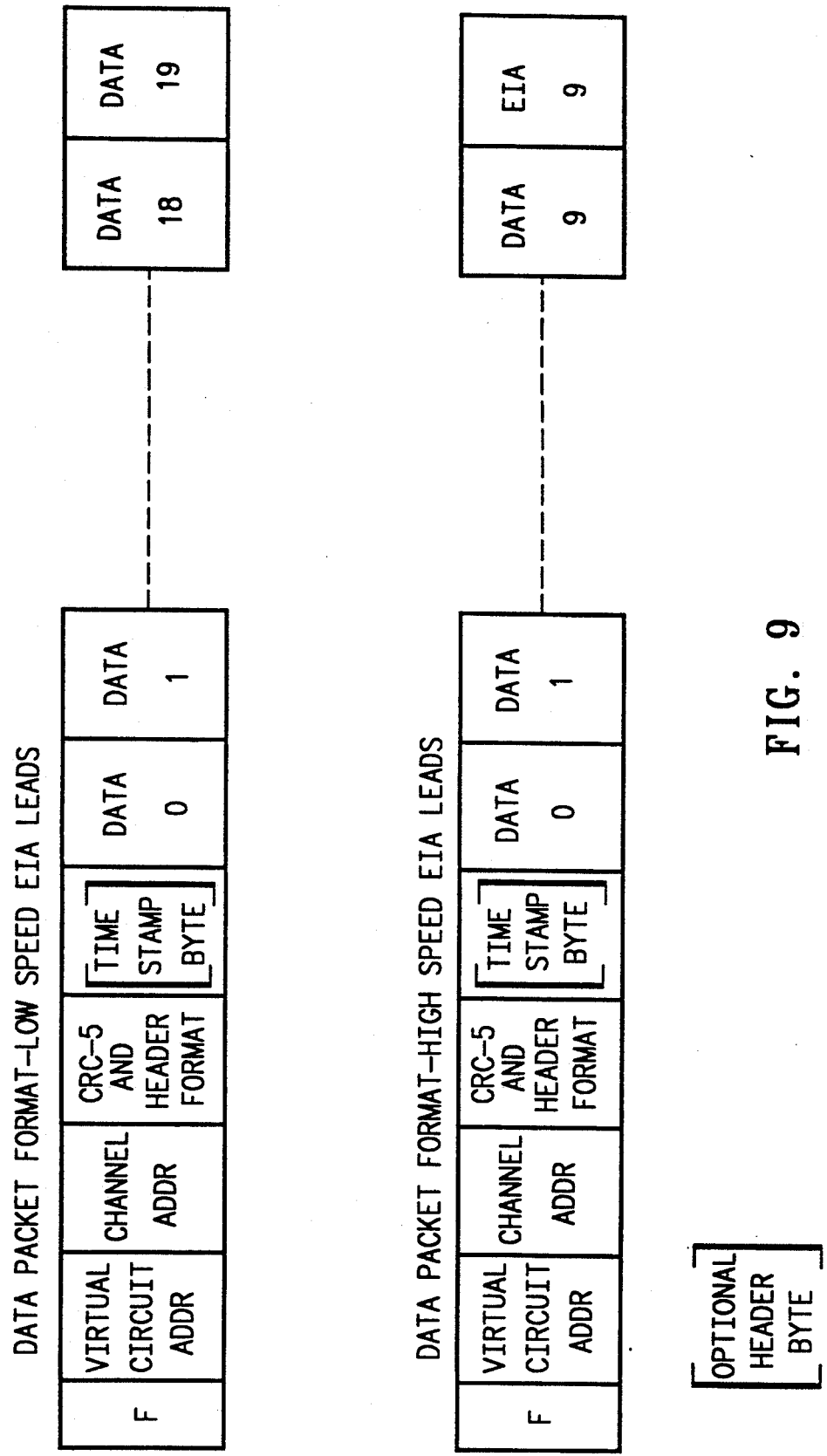
FIG. 9 shows packet formats as utilized by the SDP of FIG. 2.

FIG. 9 depicts the packet formats used by the SDP. The data packet is one T1 frame in length, just like the voice packet format. It is similar to the voice packet in that the beginning of the packet corresponds to the beginning of a T1 frame and the packets are frame synchronized by simply synchronizing to the T1 frame.

As shown in FIG. 9, there are two fundamental formats; one for low speed EIA lead handling and one for high speed EIA lead handling. The low speed format contains up to 20 consecutive samples of a particular data channel. The high speed EIA format contains 10 consecutive samples of a particular data channel along with 10 corresponding samples of the 7 selected EIA leads. The other portions of the two formats are the same. The first bit of any T1 frame is always the framing bit (F).

The first byte of the data packet format, VA0-VA7, represents a virtual circuit path number between two IPX nodes. Up to 256 virtual circuit paths can be assigned by the PCC software. The virtual addresses are reused throughout the network. However, they are not reused on packet paths that cross at the same node. In other words, when the packet is formed, the hardware attaches a virtual circuit address which is not modified by any tandem IPX nodes as the packet flows through the network. All of the IPX cards utilize the 8 bit circuit path number, but some card types such as the SDP must look at additional address information such as a channel address to route packets to a specific channel if the card has more than one channel per card. In this case, there can be a requirement for more than 256 virtual circuits between IPX nodes, and the channel field acts as an extension to the 8 bit virtual circuit address.

The second byte of the data packet format contains two fields which provide for more virtual circuit paths between IPX nodes. VC0-VC4 is a 5 bit address which is used by the PCC software to extend the number of virtual circuit paths for the data cards because they have four channels per card. P0-P1 is a 3 bit field which specifies which channel as follows:

| P2 | P1 | P0 | Channel Assignment |
|----|----|----|---------------------|
| 0 | 0 | 0 | Control Packet - channel 0 |
| 0 | 0 | 1 | Data Packet - channel 0 |
| 0 | 1 | 0 | Control packet - channel 1 |
| 0 | 1 | 1 | Data packet - channel 1 |
| 1 | 0 | 0 | Control packet - channel 2 |
| 1 | 0 | 1 | Data packet - channel 2 |
| 1 | 1 | 0 | Control packet - channel 3 |
| 1 | 1 | 1 | Data packet - channel 3 |

The third byte in of the data packet is always the header CRC and header format byte. CRC0-CRC4 represent a 5 bit error detection code which checks bit validity in the packet header (virtual circuit address byte and channel address byte). It is important to check the header information to assure that a whole packet is not ignored if an error exists in the header. In other words, the CRC5 prevents packet misrouting. HF0-HF2 represents a 3 bit code that defines the header format of the packet output to the Tl line. The codes are summarized below:

| HF2 | HF1 | HF0 | Header Format Type |
|-----|-----|-----|---------------------|
| 0 | 0 | 0 | (Escape-Expansion) |
| 0 | 0 | 1 | UNUSED, Reserved |
| 0 | 1 | 0 | Voice With Time Stamp |
| 0 | 1 | 0 | Voice, No Time Stamp |
| 1 | 0 | 0 | Data With Time Stamp |
| 1 | 0 | 1 | Data, No Time Stamp |
| 1 | 1 | 0 | UNUSED, Reserved |
| 1 | 1 | 1 | High Priority, Network Control |

The data formats selected on a per port basis under software control. The 7/8 mode allows for 7 bits of data and single "1" bit for each byte in the packet. The user's data is received, and 7 bits at a time are used to form bytes in the packet. The user's data can be of any format, and can contain any pattern including all zeros. The single "1" in the bit 0 position assures that the requirements for transmission across Tl facilities are satisfied. The 8/8 mode provides more bandwidth efficiency, but the user is responsible for meeting the requirements for transmission on Tl facilities. If the user's data does not contain at least one "1" per byte, the TXR card will force a single "1" anyway, and the SDP will note that an all zeros byte was encountered so the status can show that the data was improper and had to be modified. It is necessary to stuff a "1" for the user so that the Tl does not lose synchronization. In other words, it is important to prevent one channel from causing loss in synchronization and corrupting the data or voice information of the other Tl channels.

EIA Lead Byte Format

The EIA lead byte consists of 7 bits of EIA lead state information, and bit 0 is an odd parity bit. If parity is in error, the EIA lead information is ignored.

FIG. 15 summarizes the bandwidth efficiency of the two formats when 7/8 and 8/8 data modes are used. The high speed EIA lead format is not very efficient, but provides a means of handling applications where EIA lead transitions must be synchronized closely with the data. Fortunately, that is not normally the case and will not be used for most channels. The SDP transmit and receive sequencers can also be configured by the 68000 CPU to transmit less than 20 bytes per packet for the case where low baud rates are being used and packet building times would be too long if the SDP waited to receive 20 bytes before transmitting the packet. The transmit and receive sequencers can be programmed for a full packet or half, one quarter and one eighth full packet quantities of bytes (19, 10, 5 and 2). When less than 20 bytes are sent, the packet is still the same length but contains fewer valid data bytes. This is also a less efficient way to use the bandwidth, but provides for applications where packet transition delay is critical.

In order to provide data baud rates up to 1.344 MHz, the SDP can be configured to utilize the fourth byte as an additional sample of data instead of a time stamp measurement byte.

In FIG. 16, all 8 bits to the time stamp byte represent a delay measurement through the system in 250-500 us ticks. A delay value of zero is disallowed. When used/generated, this byte always occurs as the fourth character in the packet. Also, the header CRC in the previous byte is calentated including the time stamp byte.

Clocking Update Message

The message is sent periodically to carry low priority signaling information as well as isochronous clock frequency information. The message is designed so that occasional message loss or delay will not affect operation of the system. FIG. 17 covers the contents of these fields.

Interface Information

The "Itype" field carries the local interface type. The "DCE" field conveys the jumpered state of the interface. The bit assignments can be seen in FIG. 18.

Template Selection

The "template" field is used for template selection without PCC intervention, as seen in FIG. 19.

Clocking Information

This sixty-four bit field conveys isochronous clock recovery information. The data carried in this field are continuous. That is, the counters represented here are not reset when read. This permits proper operation even when messages are lost or delayed. The first thirty-two bits carry a "time stamp" derived from the network reference clock. Since frequency can be viewed as bits per unit time, the quotient of the changes in these values from one sample to the next will recover the input frequency.

Dibit Assignments for Interface State

For each input signal and each output signal, we use two bits to convey the current state of a signal. The signals are represented as an ordered list, using standard ordering of signals. Signal number 1 will be in bits 1 and 0 of byte fifteen, number two in bits 3 and 2, and so on. The high-order bit of each pair indicates whether the signal is steady or has changed since the last sample was sent. The low-order bit indicates what the current state of the signal is. This technique results in the following encoding:

| 1 | 1 | Steady ON |
| 1 | 0 | Steady OFF |
| 0 | 1 | Active, Currently ON |
| 0 | 0 | Active, Currently OFF |

What is claimed is:

1. A communication system comprising:

a first microprocessor for measuring at a first location the frequency of a clock signal, produced external to the system, relative to a reference clock, which is carried throughout the system by clock signal paths, to produce corresponding measurement data;

a second microprocessor at a remote location within the system to construct at said remote location a replica clock using said measurement data; and an information channel for transferring said measurement data between said first microprocessor and said second microprocessor.

2. A packet communication system comprising:

a first microprocessor for measuring at a first location the frequency of a clock signal, produced external to the system, relative to a reference clock, which is carried throughout the system by clock signal paths, to produce corresponding measurement data, said first microprocessor including means for encapsulating said measurement data into a supervisory packet;

means for transferring said supervisory packet over an information channel to a remote location as transferred direct measurement data;

a second microprocessor responsive to the transferred direct measurement data for constructing at said remote location a replica clock, corresponding to said reference clock, using said transferred direct measurement data;

isochronous means for measuring the frequency of said replica clock and for producing an outgoing clock signal at said remote location, wherein said means include timer counter mans for measuring the outgoing clock signal frequency; and means at said remote location for adjusting said outgoing clock signal frequency to match the frequency of said replica clock.

3. The system as in claim 2 wherein said isochronous means include a vernier control for updating the outgoing clock frequency signal.

4. A packet communication system, the method comprising the steps of:

measuring at a first location the frequency of a clock signal, produced external to the system, relative to a reference clock, which is carried throughout the system by clock signal paths, to produce corresponding measurement data;

utilizing packet communication to transfer said measurement data to one or more remote locations over a communication channel; and producing at said remote locations a replica clock, corresponding to said reference clock, using said measurement data.

* * * * *